United States Patent
Mathy et al.

(10) Patent No.: US 12,503,908 B2
(45) Date of Patent: Dec. 23, 2025

(54) FIRE RESISTANT VACUUM INSULATING GLAZING

(71) Applicant: AGC GLASS EUROPE, Louvain-la-neuve (BE)

(72) Inventors: Bertrand Mathy, Gosselies (BE); Thomas Lescot, Reves (BE); Pierre Schneider, Saint-Christophe-sur-le-Nais (FR); Julien Jeanfils, Walhain (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 254 days.

(21) Appl. No.: 18/252,511

(22) PCT Filed: Dec. 8, 2021

(86) PCT No.: PCT/EP2021/084855
§ 371 (c)(1),
(2) Date: May 10, 2023

(87) PCT Pub. No.: WO2022/122852
PCT Pub. Date: Jun. 16, 2022

(65) Prior Publication Data
US 2024/0026730 A1  Jan. 25, 2024

(30) Foreign Application Priority Data
Dec. 10, 2020  (EP) .................................. 20213236

(51) Int. Cl.
*E06B 5/16*  (2006.01)
*E06B 3/66*  (2006.01)
*E06B 3/663*  (2006.01)

(52) U.S. Cl.
CPC ............ *E06B 5/165* (2013.01); *E06B 3/6612* (2013.01); *E06B 3/66304* (2013.01)

(58) Field of Classification Search
CPC ............ B32B 17/069; B32B 17/10055; B32B 17/10165; B32B 2307/3065; E06B 3/6612;
(Continued)

(56) References Cited

U.S. PATENT DOCUMENTS

2015/0344357 A1  12/2015  Renier et al.
2015/0352815 A1  12/2015  Gelderie
(Continued)

FOREIGN PATENT DOCUMENTS

CN  101725307 B  5/2012
EP  2 308 675 A1  4/2011
(Continued)

OTHER PUBLICATIONS

International Search Report issued Jan. 28, 2022 in PCT/EP2021/084855 filed on Dec. 8, 2021, 4 pages.

*Primary Examiner* — Lawrence D Ferguson
(74) *Attorney, Agent, or Firm* — Oblon, McClelland, Maier & Neustadt, L.L.P.

(57) ABSTRACT

The present invention relates to a fire resistant vacuum insulating glazing assembly including at least one vacuum insulating glazing unit, and at least one intumescent glazing unit. Also provided is the use of a vacuum insulating glazing unit in a fire resistant vacuum insulating glazing assembly to improve fire resistance.

18 Claims, 8 Drawing Sheets

(58) Field of Classification Search
CPC ........ E06B 3/66304; E06B 5/16; E06B 5/165; Y02A 30/249; Y02B 80/22
See application file for complete search history.

(56) References Cited

U.S. PATENT DOCUMENTS

2020/0040570 A1\* 2/2020 Cook ................ B32B 17/10697
2021/0379871 A1 12/2021 Hermens et al.

FOREIGN PATENT DOCUMENTS

| JP | 2016-506352 A | 3/2016 |
|---|---|---|
| WO | WO 2008/084083 A1 | 7/2008 |
| WO | WO 2018/024387 A1 | 2/2018 |

\* cited by examiner

FIRE RESISTANT VACUUM INSULATING GLAZING

FIELD OF THE INVENTION

The present invention relates to fire resistant glazings having improved thermal performance and improved fire resistance.

BACKGROUND OF THE INVENTION

Fire resistant glazings are well known in the art and are designed to meet well-defined specifications, including standards such as European standards EN 1363-1 and 1364-1 for walls, or 1634-1 for doors and windows. These characteristics are of course aimed at the properties of fire resistance, but further technical characteristics must be added to meet the requirements of the users and/or the modes of manufacture.

One way of constructing fire resistant glazing is to assemble several panes of glass separated by layers of intumescent materials. The weight and thickness of fire resistant glazings may become high depending on the fire resistance performances level required, that defines the number of glass panes and layers of intumescent material. The layers of intumescent material are most often composed of hydrated alkali metal silicates. Organic hydrogels may alternatively be used such as described for instance in WO2014190444. The intumescent materials under the effect of heat, expand by forming a foam opaque to radiation, that keeps the glass walls in position even when the latter are fragmented under the effect of heat.

The use of hydrated alkali metal silicates in the manufacture of fire resistant glazings is mainly carried out according to two distinct modes.

In the first mode known as the "drying process" the layer of intumescent material is obtained by applying solutions of these silicates over a glass pane and by carrying out a more or less prolonged drying step until a solid layer is obtained. Several assemblies layer/glass pane can be piled up to obtain products having the desired fire resistance performances. The last layer of intumescent material formed is covered by a final glass pane.

In the products obtained by the first mode, the layer of intumescent material is devoid of an encompassing peripheral spacer over a perimeter thereof. In other words, the layer of intumescent material extends up to the edges of the glass panes. Typically, the optical stability of such intumescent layer is sensitive to high temperatures, and as such, these may require a layer of UV protection, provided by a construction in double glazing.

A second mode known as the "cast-in-place process" relates to products in which a silicate solution is modified by the addition of products qualified as "hardeners", "crosslinking agents" or in yet another way. These qualifications generally denote products which promote gelling of the silicate solution. They are chosen carefully so that, after their addition to the silicate solution, the latter, when left at rest, spontaneously hardens over a relatively short time into an intumescent layer, without being necessary to carry out a drying step.

For these products, before formation of the gel, the solution and its eventual additives, is poured in a cavity between two glass panes. The glass panes are joined at their periphery by a spacer which keeps them at a distance from each other, and which, with the two glass panes, defines a leaktight cavity in which the solution is poured. The fire resistant glazings obtained by this second mode comprise a peripheral spacer encompassing the intumescent layer and, consequently, the layer of intumescent material does not extend up to the edges of the glass panes.

The products obtained by the second mode are generally characterized by thicker intumescent layers having higher water contents. Consequently, one drawback is the limited resistance to low and high temperatures of the products obtained.

At low temperature such as −10° C. and less, the typical fire resistant materials (hydrated alkali metal silicates) freeze, leading to an irreversible damage of their optical quality (bubbles, cracks). To protect the intumescent materials from cold temperature, antifreeze materials are typically added to intumescent materials, such as ethylene glycol or glycerin. However, their concentration has to be limited as their presence significantly alters the fire performances. In consequence of this limitation, the use of fire resistant glazings obtained by the cast-in-place mode (here second mode) remains limited at low temperatures.

At high temperatures such as 40° C. and more, the stability of the intumescent layers, with high water content, tends to deteriorate and the intumescent layers tend to creep under their own weight, thereby deforming the fire-resistant glazing, in both the first or second mode. Furthermore, at such high temperatures, the optical properties of the intumescent layers may be altered upon ageing. Therefore, the use of such fire resistant glazings are limited for outside applications, except if mounted in double glazings.

Nowadays, in order to respond to the climate change, current market trend is to increase the thermal performance of buildings wherein glazing is an important part thereof. Hence, there is a need to design fire resistant glazings that demonstrate improved thermal performance.

One solution to increase the thermal performance of a fire resistant glazing is to include the fire resistant glazing into a double glazing system.

It has been found that designing fire resistant glazing into double glazing may not provide the necessary thermal protection to the layer of intumescent material, especially at high temperature where optical properties may be altered upon ageing. An additional issue with double glazing is the gas leakage encountered over time, which also negatively affects thermal performance of the glazing.

The issue may be solved by providing for triple glazing which will further improve thermal performance, with however some detrimental effects on space occupation and weight as the space between glass sheets needs to be of a minimal thickness to ensure thermal performance, thereby increasing the space occupation of the glazing. The large rabbets required for triple glazing construction typically adds on the cost and complication of mounting, as they do not have standard sizes. The issue of gas leakage is also present in such triple glazing.

On the other hand, vacuum insulating glazing unit (VIG) is a recent technology in the high insulating window market. Vacuum insulating glazing units are recommended because of their high-performance thermal insulation. A VIG unit is typically composed of at least two glass panes separated by an internal space in which a vacuum has been generated. In general, in order to achieve a high-performance thermal insulation, that is, having a thermal transmittance, U, being $U<1.2$ W/m2K, the absolute pressure inside the glazing unit is typically 0.1 mbar or less and generally at least one of the two glass panes is covered with a low-emissivity layer. To obtain such a pressure inside the glazing unit, a hermetically bonding seal is placed on the periphery of the two glass panes and the vacuum is generated inside the glazing unit by virtue of a pump. To prevent the glazing unit from caving in under atmospheric pressure (due to the pressure difference between the interior and exterior of the glazing unit), discrete pillars are placed between the two glass panes.

However, there is still a need to provide a fire resistant glazing demonstrating highly superior thermal performance and improved fire resistance.

SUMMARY OF THE INVENTION

The present invention provides for a fire resistant vacuum insulating glazing assembly comprising:
i. at least one vacuum insulating glazing unit comprising:
   a. a first glass pane, GP1, having an inner pane face and an outer pane face and a second glass pane, GP2, having an inner pane face and an outer pane face;
   b. a set of discrete pillars positioned between the first and second glass panes, maintaining a distance between the first and the second glass panes;
   c. a hermetically bonding seal sealing the distance between the first and second glass panes over a perimeter thereof;
   d. an internal volume, V, defined by the first and second glass panes and closed by the hermetically bonding seal; wherein there is a vacuum of absolute pressure of less than 0.1 mbar; and wherein the inner pane faces face the internal volume, V;
and
ii. a third glass pane, GP3, having an inner pane face and an outer pane face;
and
iii. at least one intumescent glazing unit comprising:
   a fourth glass pane, GP4, having an inner pane face and an outer pane face,
   a layer of intumescent material positioned between the inner pane faces of said third and fourth glass panes GP3 and GP4;
and
iv. a circumferential spacer frame positioned between the outer pane face of the second glass pane GP2 and the outer pane face of the third glass pane GP3 over a perimeter thereof, and maintaining a distance there between,
wherein the circumferential spacer frame, the outer pane face and the outer pane face define an internal space, Sp.

3. DETAILED DESCRIPTION OF THE INVENTION

Figure 1A:
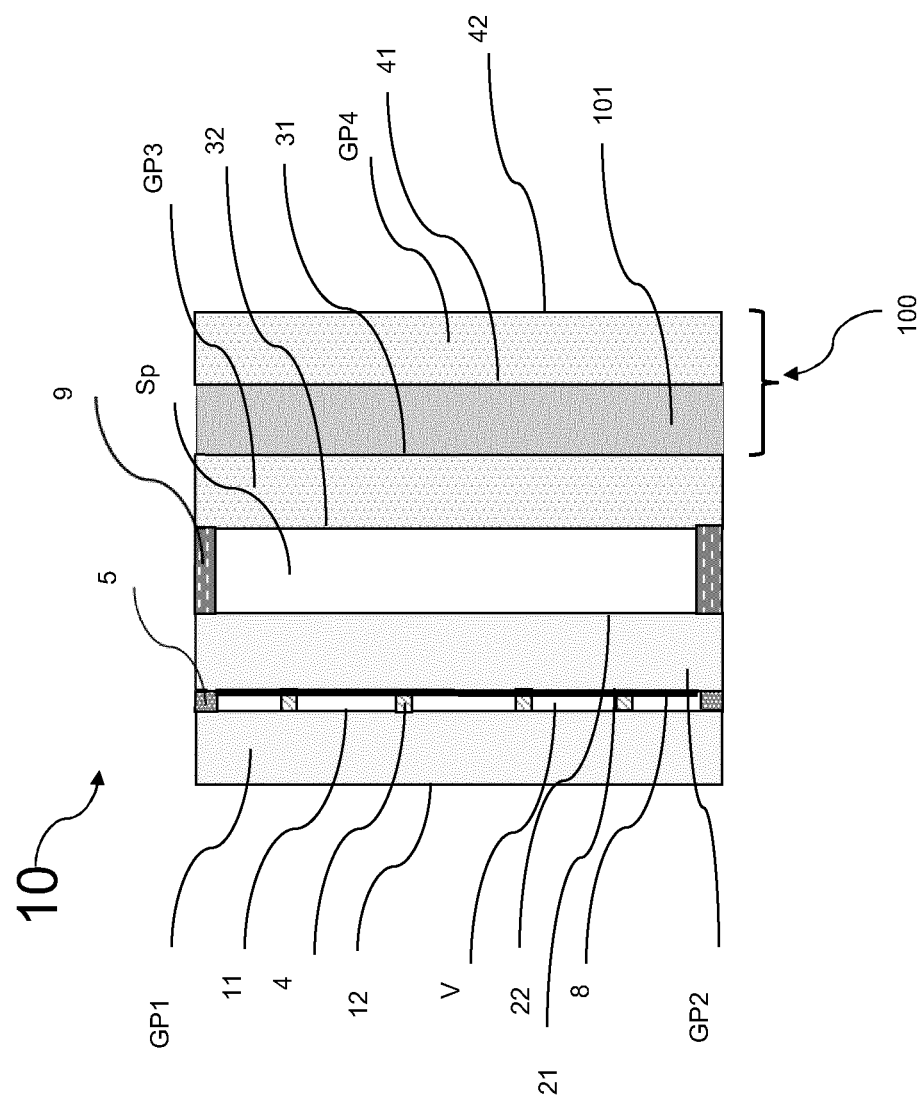
FIGS. 1a and 1b show a cross sectional view of a fire resistant vacuum insulating glazing assembly according to embodiments of the present invention, comprising one vacuum insulating glazing unit and one intumescent glazing unit.

The present invention relates to a "fire resistant vacuum insulating glazing assembly". Such object is hereinafter equally referred as a whole to "FR-VIG". It comprises a vacuum insulating glazing unit hereinafter equally referred to as "VIG" and one or more intumescent glazing unit(s) hereinafter equally referred to as "IU".

The present fire resistant vacuum insulating glazing assembly allows for glazing having a high thermal and energetical performance, with reduced weight and thickness as compared to a triple glazing. The present fire resistant vacuum insulating glazing assembly also allows for glazing having an improved fire resistance.

Although assembled like a triple glazing, the present FR-VIG has an improved thermal performance due to the VIG unit, with a reduced occupied space.

Thermal performance may also be optimized with functional coatings provided on at least one glass pane face of a glass pane of the assembly, as compared to a standard double glazing assembly. UV protection may also be provided using functional coatings on at least one glass pane of the VIG unit.

One object of the invention is to provide a fire resistant glazing that demonstrates improved thermal performance, with said thermal performance stable in time, and with improved fire resistance.

It has been surprisingly found that the FR-VIG of the present invention demonstrates superior thermal performance while avoiding the loss of thermal performance overt time which may potentially arise in typical double or triple glazing systems, because of gas loss.

Moreover, in some specific applications with very high fire resistance performance and/or high thermal performance, no compatible frame are currently existing because of the thickness of the glazing. The present invention therefore provides a technical solution to such particular FR-VIGs. Furthermore, the width of the rabbet of the corresponding frame can be similarly reduced and therefore it improves retaining and preservation of the glazing assembly integrity when exposed to a fire hazard.

The glass panes suitable for the present invention can be of any type such as float glass panes or alternatively cast or drawn glass panes and can be chosen among all glass technologies such as: float clear, extra-clear or colored glass, (partially) acid etched or (partially) sand blasted glass and combinations thereof. The glass may be a soda-lime-silicate glass, an alumino-silicate glass, an alkali-free glass, a borosilicate glass and the like. It may be a clear, extra-clear/low-iron or colored glass sheet. Preferably, the glass panes of the invention are made of a soda-lime glass or of an alumino-silicate glass. Non-limiting examples of glass panes are Planibel® Clear, Linea Azzura®, Dragontrail®, Tirex®, Falcon®, Clearvision®, Clearlite®.

The glass panes can be at least partially coated by a functional coating. By partially coated is meant that at least a part of at least one of their faces can be coated with any suitable functional coating depending on the needs such as for instance a low-emissivity coating, a solar control coating, a UV protection coating, an enamel or any combinations thereof. In the particular case where a functional coating would be in contact with the layer of intumescent material, suitable coatings are those being compatible with the layer of intumescent material. For instance compatible with the strongly alkaline or acidic character of such compositions.

Thermally treated or chemically tempered glass panes can be used. The thermally treated glass pane can be treated by any thermal treatment known by the skilled person such as heat strengthening (according to EN 1863-1:2011), thermal toughening (according to EN 12150-2:2015) or thermal toughening and heat soaking (according to EN 14179-2:2005). The glass pane thermally treated according to these standards is suitable as safety glass. Chemical tempering is particularly suited for thin glass panes.

In some instances, at least one of the glass panes in contact with the layer of intumescent material is a thermally treated glass pane. In some instances, both glass panes in contact with the layer of intumescent material are thermally treated glass panes.

The fire resistant vacuum insulating glazing assembly of the invention comprises a vacuum insulating glazing unit, VIG, which comprises a first glass pane, GP1, and a second glass pane, GP2, that are spaced apart by way of a set of discrete pillars, a hermetically bonding seal and an internal volume. The set of discrete pillars holds said panes a certain distance apart. This distance is typically in the range of between 50 µm and 1000 µm, preferably between 50 µm and 500 µm and more preferably between 50 µm and 150 µm. Between said glass panes, an internal volume, V, wherein there is a vacuum of absolute pressure of less than 0.1 mbar, is closed with a hermetically bonding seal placed on the periphery of the glass panes around said internal space.

The first and the second glass panes have each an inner pane face and an outer pane face. Each inner pane face faces the internal volume, V. In one embodiment, the thickness of the first glass pane, Z1, is identical to the thickness of the second glass pane, Z2, (Z1=Z2). In another embodiment, the thickness of the first glass pane, Z1, is greater or lower than the thickness of the second glass pane, Z2 (Z1>Z2 or Z1<Z2). The thickness of the first and/or second glass panes, Z1, Z2, of the VIG unit, are typically equal to or greater than 2 mm (Z1, Z2≥2 mm), preferably are equal to or greater than 3 mm, (Z1, Z2≥3 mm), more preferably equal to or greater than 4 mm, (Z1, Z2≥4 mm) more preferably equal to or greater than 6 mm, (Z1, Z2≥6 mm). Typically, the thickness of the first and second glass panes, will be not more than 12 mm, preferably not more than 10 mm, more preferably not more than 8 mm.

The VIG of the present invention comprises a set of discrete pillars, sandwiched between GP1 and GP2 so as to maintain the internal volume, V. The discrete pillars are positioned between the GP1 and GP2, maintaining a distance between them and forming an array having a pitch, λ, comprised between 10 mm and 100 mm (10 mm≤λ≤100 mm). By pitch, it is meant the interval between the discrete spacers. In a preferred embodiment, the pitch is comprised between 20 mm and 80 mm (20 mm≤λ≤80 mm), more preferably between 20 mm and 50 mm (20 mm≤λ≤50 mm). The array is typically a regular array based on an equilateral triangular, square or hexagonal scheme, preferably based on a square scheme.

The discrete pillars can have different shapes, such as cylindrical, spherical, filiform, hourglass, C-shaped, cruciform, prismatic shape . . . . It is preferred to use small pillars, i.e. pillars having in general a contact surface to the glass pane equal to or lower than 5 mm$^2$, preferably equal to or lower than 3 mm$^2$, more preferably equal to or lower than 1 mm$^2$. These values may offer a good mechanical resistance whilst being aesthetically discrete. The discrete spacers are typically made of a material having a strength endurable against pressure applied from the surfaces of the glass panes, capable of withstanding high-temperature process such as burning and baking, and hardly emitting gas after the glass pane is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

The internal volume, V, delimited between the glass panes of the VIG is closed with a hermetically bonding seal placed on the periphery of the glass panes around said internal volume. The said hermetically bonding seal is impermeable and hard. The term "impermeable" is herein understood to mean impermeable to air or any other gas present in the atmosphere.

Various hermetically bonding seal technologies exist. A first type of seal (the most widespread) is a seal based on a solder glass for which the melting point is lower than that of the glass of the glass panes of the glazing unit. The use of this type of seal limits the choice of low-E layers to those that are not degraded by the thermal cycle required to implement the solder glass, i.e. to those that are able to withstand a temperature possibly as high as 250° C.

A second type of seal comprises a metal seal, for example a metal strip of a small thickness (<500 µm) soldered to the periphery of the glazing unit by way of a tie underlayer covered at least partially with a layer of a solderable material such as a soft tin-alloy solder. One substantial advantage of this second type of seal relative to the first type of seal is that it is able to partially deform in order to partially absorb the differential expansion created between the two glass panes. There are various types of tie underlayers on the glass pane.

Patent application WO2011/061208A1 describes one example embodiment of a peripheral impermeable seal of the second type for a vacuum insulating glazing unit. In this embodiment, the seal is a metal strip, for example made of copper that is soldered by means of a solderable material to an adhesion band provided on the periphery of the glass panes.

A vacuum of absolute pressure less than 0.1 mbar, preferably less than 0.01 mbar is created, within the internal volume, V, defined GP1 and GP2 and closed by the hermetically bonding seal. Energy transfer through a VIG is greatly decreased by the vacuum. To generate the vacuum in the internal space of the glazing unit, a hollow glass tube bringing the internal space into communication with the exterior is generally provided on the main face of one of the glass panes. Thus, the partial vacuum is generated in the internal volume by pumping out gases present in the internal space by virtue of a pump connected to the exterior end of the glass tube.

To maintain over time a given vacuum level in a VIG a getter may be used in the glazing unit. Specifically, the internal surfaces of the glass panes making up the glazing unit may release over time gases absorbed beforehand in the glass, thereby increasing the internal pressure in the vacuum insulating glazing pane and thus decreasing the vacuum performance. Generally, such a getter consists of alloys of zirconium, vanadium, iron, cobalt, aluminum, etc., and is deposited in the form of a thin layer (a few microns in thickness) or in the form of a block placed between the glass panes of the glazing pane so as not to be seen (for example hidden by an exterior enamel or by a portion of the peripheral impermeable seal). The getter forms, on its surface, a passivation layer at room temperature, and must therefore be heated in order to make the passivation layer disappear and thus activate its alloy gettering properties. The getter is said to be "heat activated".

The fire resistant vacuum insulating glazing assembly of the present FR-VIG comprises a third glass pane, GP3, having an inner pane face and an outer pane face. Said glass pane may be any of these as discussed above.

The fire resistant vacuum insulating glazing assembly further comprises at least one intumescent glazing unit, IU comprising
  a fourth glass pane, GP4, having an inner pane face and an outer pane face,
  a layer of intumescent material (101) positioned between the inner pane faces of said third and fourth glass panes GP3 and GP4.

The terms "intumescent layer" and "layer of intumescent material" may be used interchangeably in the scope of the present invention.

By intumescent material is meant a material which will swell or expand upon heating above a temperature of 100° C. The swelling is typically a consequence of the phase transition of the interstitial water from the liquid phase to the vapor phase within the intumescent material. The associated volume expansion of said water leads to the foaming of the material. The materials will thus intumesce upon exposure to heat to form an opaque foam. The foam serves to assist the structure of the glazing and acts as a barrier to radiant heat. The thickness of the layer of intumescent material may thus increase by a factor ranging from two to a few dozen.

In a first alternative of the invention, the layer of intumescent material positioned between the inner pane faces of the third and fourth glass panes GP3 and GP4 is devoid of an encompassing peripheral spacer over a perimeter thereof. In other words, the layer of intumescent material of the invention extends up to the edges of the third and fourth glass panes GP3 and GP4.

In such instances, the at least one intumescent glazing unit, IU, comprises
  a fourth glass pane, GP4, having an inner pane face and an outer pane face,
  a layer of intumescent material positioned between the inner pane faces of said third and fourth glass panes GP3 and GP4 devoid of an encompassing peripheral spacer.

A fire resistant vacuum insulating glazing assembly according to the first alternative of the invention thus comprises:
  i. at least one vacuum insulating glazing unit comprising:
    a. a first glass pane, GP1, having an inner pane face and an outer pane face and a second glass pane, GP2, having an inner pane face and an outer pane face;
    b. a set of discrete pillars positioned between the first and second glass panes, maintaining a distance between the first and the second glass panes;
    c. a hermetically bonding seal sealing the distance between the first and second glass panes over a perimeter thereof;
    d. an internal volume, V, defined by the first and second glass panes and closed by the hermetically bonding seal; wherein there is a vacuum of absolute pressure of less than 0.1 mbar; and wherein the inner pane faces face the internal volume, V;
    and
  ii. a third glass pane, GP3, having an inner pane face and an outer pane face;
    and
  iii. at least one intumescent glazing unit comprising:
    a fourth glass pane, GP4, having an inner pane face and an outer pane face,
    a layer of intumescent material positioned between the inner pane faces of said third and fourth glass panes GP3 and GP4 devoid of an encompassing peripheral spacer;
    and
  iv. a circumferential spacer frame positioned between the outer pane face of the second glass pane GP2 and the outer pane face of the third glass pane GP3 over a perimeter thereof, and maintaining a distance there between and;
    wherein the circumferential spacer frame, the outer pane face, and the outer pane face define an internal space, Sp.

An intumescent unit devoid of a peripheral spacer encompassing the layer of intumescent material is typically obtained by the drying process, detailed hereafter.

The layer of intumescent material in the first alternative of the invention may be selected from:
  a layer of hydrated alkali metal silicate composition,
  a layer of organic hydrogel,
  a layer comprising a hydrated alkali metal silicate composition and organic hydrogel, present in the form of a mixture or in the form of different sub-layers.

The layer of intumescent material may thus be a layer of hydrated alkali metal silicate composition. It may alternatively be a layer of organic hydrogel such as those described for instance in WO2014190444. Alternatively, the layer of intumescent material may also be a layer comprising both organic hydrogel and a hydrated alkali metal silicate composition, present in the form of a mixture, or in the form of different sub-layers. By this last variant is meant that the layer of intumescent material may comprise at least one sub-layer of organic hydrogel and one sub-layer of hydrated alkali metal silicate composition.

In a preferred embodiment of the first alternative of the invention, the layer of intumescent material is a layer of hydrated alkali metal silicate composition. In comparison to organic hydrogels, the hydrated alkali metal silicates have a better thermal stability and better ageing resistance such as better resistance to yellowing. For instance, EP3395928A1 discloses the yellowing issue of organic hydrogels.

The alkali metal silicates used in the hydrated alkali metal silicate compositions are generally chosen among potassium, sodium and lithium silicates. It is possible to have a mixture of these silicates in varying proportions. However, sodium silicates or potassium silicates or mixtures thereof are preferred for the first alternative of the invention.

In the present first alternative of the invention, the molar ratio $SiO_2/M_2O$ of the alkali metal silicates composition preferably ranges from 2.5 to 8. It is more preferably at least 3, most preferably at least 3.2. More preferably it is at most 6, most preferably at most 5.3. M being an alkaline, typically potassium or sodium or a combination of the two.

The choice of the amount of water content is a function not only of the fireproof properties, but also of the optical quality of the glazings obtained. For high water contents the layer of hydrated alkali metal silicate composition tends to be less stable on ageing. It is difficult to guarantee that these products remain perfectly transparent. It often forms a haze that becomes more pronounced over time.

For this reason, the water content of the layer of hydrated alkali metal silicate composition in the first alternative of the invention is typically ranging from 18 to 50 wt % on the total weight of the layer, preferably it is at most 45 wt %, most preferably at most 42 wt %.

Preferred layers of hydrated alkali metal silicate compositions in the first alternative of the invention are hydrated alkali metal silicate compositions comprising potassium and/or sodium silicates with a molar ratio $SiO_2/M_2O$ ranging from 2.5 to 8 and having a water content of 18 to 50 wt % of the layer.

The layer of intumescent material suitable for the first alternative of the invention typically has a thickness ranging from 1 to 30 mm. Below 1 mm, the fire resistance performances are limited and above 30 mm the drying time to obtain the layer becomes too long. The thickness of a layer of organic hydrogel is more typically ranging from 5 to 30 mm. The thickness of a layer of hydrated alkali metal silicate composition more typically ranges from 1 to 10 mm, preferably from 1.2 to 6 mm.

In a second alternative of the invention, the layer of intumescent material positioned between the inner pane faces of the third and fourth glass panes GP3 and GP4 is encompassed by a peripheral spacer. Said peripheral spacer delimits a space, or volume (Vi) between said third and fourth glass panes, said space being filled with said intumescent material.

In such instances, the at least one intumescent glazing unit, IU, comprises
  a fourth glass pane, GP4, having an inner pane face and an outer pane face,
  a peripheral spacer defining an IU volume, Vi, between the inner pane faces of said third and fourth glass panes GP3 and GP4,
  a layer of intumescent material positioned between the inner pane faces of said third and fourth glass panes GP3 and GP4 in the Vi volume.

A fire resistant vacuum insulating glazing assembly according to the second alternative of the invention thus comprises:
  i. at least one vacuum insulating glazing unit comprising:
    a. a first glass pane, GP1, having an inner pane face and an outer pane face and a second glass pane, GP2, having an inner pane face and an outer pane face;
    b. a set of discrete pillars positioned between the first and second glass panes, maintaining a distance between the first and the second glass panes;
    c. a hermetically bonding seal sealing the distance between the first and second glass panes over a perimeter thereof;
    d. an internal volume, V, defined by the first and second glass panes and closed by the hermetically bonding seal; wherein there is a vacuum of absolute pressure of less than 0.1 mbar; and wherein the inner pane faces face the internal volume, V;
  and
  ii. a third glass pane, GP3, having an inner pane face and an outer pane face;
  and
  iii. at least one intumescent glazing unit comprising:
    a fourth glass pane, GP4, having an inner pane face and an outer pane face,
    a peripheral spacer defining an IU volume, Vi, between the inner pane faces of said third and fourth glass panes GP3 and GP4,
    a layer of intumescent material positioned between the inner pane faces of said third and fourth glass panes GP3 and GP4 in the Vi volume;
  and
  iv. a circumferential spacer frame positioned between the outer pane face of the second glass pane GP2 and the outer pane face of the third glass pane GP3 over a perimeter thereof, and maintaining a distance there between and;
    wherein the circumferential spacer frame, the outer pane face, and the outer pane face define an internal space, Sp.

The volume Vi thus encompasses the layer of intumescent material, which is facing the inner pane faces of GP3 and GP4. Due to the presence of the peripheral spacer, the layer of intumescent material does not extend to the edges of the glass panes. Such an intumescent unit comprising a peripheral spacer encompassing the layer of intumescent material is typically obtained by the cast-in-place process, described later.

Similarly to the first alternative, the layer of intumescent material of the second alternative may be a layer of hydrated alkali metal silicate composition or a layer of organic hydrogel. Alternatively, the layer of intumescent material may also be a layer comprising both an organic hydrogel and hydrated alkali metal silicate composition. In this case, the organic hydrogel and the hydrated alkali metal silicate composition are preferably present in the form of a mixture. Sub-layers of organic hydrogel and hydrated alkali metal silicate composition can generally not be obtained by the cast-in-place process.

In a preferred embodiment of the second alternative of the invention, the layer of intumescent material is a layer of hydrated alkali metal silicate composition. In comparison to organic hydrogels, the hydrated alkali metal silicates have a better thermal stability and better ageing resistance such as better resistance to yellowing, as disclosed earlier with reference to the first alternative of the invention.

The alkali silicates used in the hydrated alkali metal silicate compositions of the second alternative are generally chosen among potassium, sodium and/or lithium silicates. It is possible to have a mixture of these silicates in varying proportions. However, potassium silicates are preferred. Potassium silicates, for an identical $SiO_2/M_2O$ ratio, which is the ratio between the number of moles of silica and the number of moles of alkali metal oxide present in the hydrated alkali metal silicate composition, have a higher glass transition temperature (Tg) of the foam than sodium silicates. Their use therefore favors fire resistant properties. In addition, they provide better transparency. Potassium silicates, particularly those formed synthetically by reaction of colloidal silica with potassium hydroxide, remain quite transparent regardless of the water content compared to the similar behavior of sodium silicates. Application opportunities are therefore larger with potassium silicates. It is also possible to use mixtures of potassium and sodium silicates. Such mixtures, however, lead to lower foam Tg than those observed for potassium silicates only. The mixture for equivalent proportions of potassium and sodium silicates may even lead to a lower Tg than the two silicates used individually, the mixture is believed to form an eutectic system. Preferably, potassium silicates represent at least 60% by weight, more preferably at least 80% by weight of all the silicates. Preferred alkali metal silicates are mixtures of potassium and sodium silicates, more preferably mixtures with more than 90% by weight of potassium silicates and less than 10% by weight of sodium silicates.

The water content of the layer of intumescent material, impacts the "refractory" character of the layer, and partly conditions its fire resistance properties. To enhance this refractory character attenuated by this water content, it is preferable to choose compositions in which the $SiO_2/M_2O$ molar ratio, M being an alkaline, typically potassium or sodium or a combination of the two, is relatively high (i.e. higher than 4). In a preferred embodiment, the layer of intumescent material in the second alternative of the invention is based on hydrated alkali metal silicates, preferably with $SiO_2/M_2O$ molar ratio from 3 to 8. It is more preferably at least 4, most preferably at least 4.5. More preferably it is at most 6, most preferably at most 5.3.

The layer of hydrated alkali metal silicate composition is obtained from a hydrated alkali metal silicate precursors mixture also equally referred to as silicate precursors mixture. To prepare the silicate precursors mixture to be poured in the volume Vi of the second alternative of the invention, it is preferred to start from suspensions of colloidal silica and alkaline hydroxide. The latter is either in the form of a solution or at least partly in the form of solid pellets to limit as much as possible the water content of the mixture.

If the silica suspensions do not ordinarily exceed 50% by weight of silica, the compositions obtained by reaction of these suspensions with the alkaline hydroxide may have a substantially lower water content than that of the industrial silicates and so with $SiO_2/M_2O$ much higher ratios. If nevertheless for economic reasons, it is preferred to use, at least partially, industrial silicates, it remains necessary to modify them by a substantive addition of colloidal silica to achieve mixtures having the desired molar ratios without the need to eliminate an excessive quantity of water.

In addition, the hardening of the silicate precursors mixtures in which the use of silica suspension is involved, depends further, at least partly, on the size of the silica particles used. In general, an increase of the particles size—within certain limits, makes it possible to delay the caking of the mixture. Therefore, by increasing the silica particle size, a reduced water content can be obtained, while maintaining the required viscosity of the mixture for further processing. Typical water content for mixtures with silica of standard particle size, is 44%-55% by weight of the intumescent material precursors mixtures. Mixtures comprising silica having particles of increased dimensions, can achieve much lower water content, down to 30% by weight, while retaining the necessary rheological properties.

Obviously, the increase in particle size is limited since beyond a certain dimension, the mixtures no longer exhibit the required optical properties, and in particular transparency. Too large dimensions of the silica particles lead to a diffusion of light, and to the formation of a haze. In practice, the silica particles used for the formation of the silicate precursors mixture have an average diameter of not less than 40 nm and preferably not less than 50 nm. These particles also have average dimensions which do not exceed advantageously 150 nm and preferably not 130 nm. The particularly preferred average diameter is between 60 nm and 120 nm.

Typically, the mixture of silicate precursors has a water content between 44% and 55% before any further optional dehydration step. The presence of this relatively abundant water can however lead to a lack of cohesion of the glazing. Subject to shear forces in the plane of the glazing, the glass panes, even at ordinary temperature, are likely to move against each other. Moreover, the high water content can also produce a very irregular "foam", detrimental to the integrity of the intumescent unit. High water content in the layer of intumescent material may require strengthening the edge protection to avoid alteration over time, consecutive for example to a progressive drying from these edges.

Therefore, in the second alternative of the invention, such precursors mixture will optionally go through a partial dehydration step to reach a water level content of 35% to 48% by weight of the mixture of silicate precursors, before being poured into the intumescent unit volume of the intumescent unit. The water content is preferably at least 40%, more preferably at least 42%. Preferably it is at most 48%, more preferably at most 46%.

The silicate precursors mixture in the second alternative of the invention typically comprises hardeners also known as curing agents or crosslinking agents. By "hardeners or curing agent or crosslinking agents" it is generically referred to products that promote the gelling of the silicate precursors mixture. The hardeners are specifically selected so that, after their addition to the silicate precursors mixture, the mixture hardens spontaneously in a relatively short time, without the need for drying. The absence of a drying step is a definite advantage since the layer of intumescent material does obviously retain a relatively high water content.

The silicate precursors mixture when prepared and ready to be poured in the into the intumescent unit volume, i.e. after optional partial dehydration, in the second alternative of the invention, has a composition that is substantially the same as the composition of the layer of intumescent material obtained after hardening of the mixture. Indeed, substantially no drying of the mixture occurs after having it poured in the intumescent unit volume. Therefore, the layer of hydrated alkali metal silicate of the second alternative of the invention has preferably a water content from 35% to 48% by weight of the layer. The water content is preferably at least 40%, more preferably at least 42%. Preferably it is at most 48%, more preferably at most 46%.

Preferred layers of hydrated alkali metal silicate compositions in the second alternative of the invention are hydrated alkali metal silicate compositions comprising potassium and/or sodium silicates with a molar ratio $SiO_2/M_2O$ ranging from 3 to 8 and having a water content of to 48 wt % of the layer.

The layer of intumescent material suitable for the second alternative of the invention typically has a thickness ranging from 2 to 30 mm. The thickness preferably ranges from 3 to 15 mm, more preferably from 3 to 8 mm. Below 2 mm, the fire resistance performances are limited and above 30 mm, further thickness does not bring any substantial addition of anti-fire performance but rather can cause more creeping disadvantage.

The intumescent glazing unit according to the second alternative of the invention comprises an intumescent unit peripheral spacer. The peripheral spacer extends over a perimeter between the inner pane faces of the third and fourth glass panes GP3 and GP4, and tightly adheres thereto. It defines together with said inner pane faces, an intumescent unit volume, Vi, that encompasses the layer of intumescent material. The peripheral spacer typically comprises an opening to allow pouring the intumescent material precursors mixture into the intumescent unit volume. This opening is sealed at the end of the fabrication process.

In its role of maintaining the layer of intumescent material within Vi, the peripheral spacer must of course provide proper tightness properties, at the very least to avoid release of the intumescent material precursors mixture and of the obtained layer of intumescent material. It is further required that the material of the intumescent unit peripheral spacer should not be altered by the contact with the intumescent material precursors mixture nor by the contact with the layer of intumescent material. In particular, it should not be altered by the hydrated alkali metal silicate composition known to be very strongly basic, and/or by the organic hydrogel, known to be acidic, nor by their corresponding precursors mixtures. The intumescent unit peripheral spacer must still strongly adhere to the glass panes to resist to the possible deformation of the FR-VIG due to the potential creeping of the layer of intumescent material over time.

Examples of peripheral spacers include metal spacer, ceramic spacer, glass spacer, polymeric spacer, and combinations or composites thereof.

Polymeric peripheral spacers include polyisobutylene-butyl mixture, extruded butyl rubber seal, silicone rubber, polymethylmethacrylate, polycarbonate, polystyrene, polyamide, polyester, and mixtures or combinations of these.

Polyisobutylene-butyl mixture (also known as thermoplastic spacer or TPS) or extruded butyl rubber seal have intrinsic tightness and adhesion properties. They offer the advantage of allowing good adhesion to the glass panes, and to compensate for irregularities in the flatness of these panes, thus ensuring a good seal. They also offer the advantage to adapt to all possible shapes. To give such thermoplastic spacers or extruded butyl rubber seal a good UV resistance, and sufficient rigidity to maintain the distance between the glass panes, they are sometimes reinforced by various fillers, including carbon black, mineral powders such as glass powders.

Silicone rubbers exist as alternatives to butyl rubbers for improved chemical resistance in alkaline conditions.

Amongst the polymeric peripheral spacers some may provide transparency along the glazing edges such as those comprising polymethylmethacrylate (PMMA), polycarbonate, polystyrene, polyamide or polyester.

Other suitable intumescent unit peripheral spacers are described in WO2009/007452 wherein the spacer is made of a rigid or semi-rigid material resistant to alkali silicate, and forms a profile of which at least the parts facing the glass panes are coated with an adhesive also resistant to alkaline silicate.

Metal, ceramic or glass peripheral spacers are more rigid materials. Metal spacers have a thermal expansion coefficient that is substantially different from that of the glass panes and they have high thermal conductivity. For this reason, the use of spacers made of ceramic material having a coefficient of expansion similar to that of glass panes may also be used, or even glass spacer.

In instances where the peripheral spacer does not have intrinsic adhesive properties, a first peripheral seal is required to tightly adhere the peripheral spacer to the glass panes. The first peripheral seal is connecting the peripheral spacer to the inner pane faces of the third and fourth glass panes GP3 and GP4. The first peripheral seal may be opaque or transparent, or translucent Examples of first peripheral seal include polyisobutylene, silicone, acrylic resin, epoxy resin, polyurethane resin, and mixtures or combinations thereof.

In addition to the role of maintaining the layer of intumescent material within the intumescent unit volume, the intumescent unit peripheral spacer must also protect the layer of intumescent material against external influences which may alter the properties, especially the optical properties. Silicate components are sensitive to possible transfer of water from the outside atmosphere. A local modification of the water content of the silicate can cause the appearance of a haze at the periphery of the glazing.

A second peripheral seal may thus be provided to cover the edge of the glazing with a material that prevents the passage of water vapor.

Examples of second peripheral seal include polyisobutylene, silicone, polysulfide, polyurethane or mixtures or combinations thereof. The polysulfide may preferably be chosen as it adheres well to glass panes and is compatible with the other materials of the peripheral spacer.

Some resins such as polyisobutylene may be suitable as first peripheral seal or second peripheral seal depending on their molecular weight, as is well known by the skilled person in the art.

In either one of the first and second alternatives of the invention, when the layer of intumescent material is a layer of hydrated alkali metal silicate composition, various additives may be present in the composition such as polyols, and in particular ethylene glycol or glycerol. Polyols are intended to compensate the lack of plasticity of the hydrated alkali metal silicates. In the first alternative of the invention, polyols are generally present in the layer of hydrated alkali metal silicate composition at a concentration ranging from 0 to 22 wt %, alternatively from 3 to 18 wt % of the silicate composition. In the second alternative of the invention, polyols are generally present in the layer of hydrated alkali metal silicate composition at a concentration ranging from 0 to 20 wt %, alternatively from 0 to 10 wt %, alternatively from 3 to 8%, of the silicate composition.

In either one of the first and second alternatives of the invention, the layer of hydrated alkali metal silicate composition also comprises other additives in small proportions such as silicate stabilizing agents. These are for instance nitrogen products (urea, amines . . . ) which favor the development of regular foams, or surfactants which promote the wetting of the glass panes with which the layer of hydrated alkali metal silicate composition is in contact. Advantageously, the layer of hydrated alkali metal silicate composition contains tetra-methyl ammonium hydroxide (TMAH) at a content of at most 2 wt % of the silicate composition.

In either one of the first and second alternatives of the invention, to improve the adhesion of the layer of intumescent material to the glass panes, adhesion promoters can be present, such as for example, silanes and functionalized silanes such as amino-silanes.

As used in the present invention, the wording "in contact with" does not preclude the presence of a coating such as those described supra (such as low-emissivity, solar control coating, enamel) or of an adhesion promoter on the surface of the glass pane, which are herein considered to be part of the glass pane.

The present fire resistant vacuum insulating glazing assembly further comprises a circumferential spacer frame positioned between the outer pane face of the second glass pane GP2 and the outer pane face of the third glass pane GP3 over a perimeter thereof, and maintaining a distance there between, wherein the circumferential spacer frame and said outer pane faces define an internal space, Sp.

The circumferential spacer frame denotes a rigid element positioned between the glass panes, which holds them at a certain distance and which extends along the edges of the glazing, forming an internal space (Sp).

In its role of maintaining an internal space Sp, the circumferential spacer frame must of course provide proper tightness properties. It is critical for a circumferential spacer frame to prevent the release of gas form the internal space Sp and also to prevent the entry of water vapour.

The circumferential spacer frame is typically an object of elongated shape and constant cross section, which maintains the distance between the outer pane face of the second glass pane GP2 and the outer pane face of the third glass pane GP3 over a perimeter thereof. The circumferential spacer frame may be a solid or hollow element.

Examples of circumferential spacer frame include metal spacer, ceramic spacer, glass spacer, polymeric spacer, and combinations or composites thereof.

Examples of polymeric circumferential spacer include polyisobutylene-butyl mixture, butyl rubber seal, silicone rubber, polymethylmethacrylate, polycarbonate, polystyrene, polyamide, polyester, and mixtures or combinations of these.

Further examples of polymeric circumferential spacer include transparent rigid materials such as polymethylmethacrylate (PMMA), polycarbonate, polystyrene, polyamide or polyester, which may provide transparency along edges. These are more rigid materials than extruded polymers.

Metal, ceramic or glass circumferential spacers are also more rigid materials.

Examples of metal include galvanized steel, stainless steel, aluminium alloy.

Examples of composite circumferential spacer include polypropylene/stainless steel.

The circumferential spacer frame may typically be provided with a desiccant or desiccative material.

When the circumferential spacer frame is a hollow frame, the desiccative material will at least partially fill the hollow space. Examples of desiccative materials capable of filling the hollow space are silica gels and molecular sieves.

When the circumferential spacer frame is a solid polymeric frame, the desiccative material may be incorporated into the polymer matrix. An example of such a desiccative polymer is a polymer comprising an integrated molecular sieve.

The internal space Sp is bordered by the circumferential spacer frame and may be filled with a gas. The gas of the internal space is typically an inert gas capable of thermally insulating the glazing. The internal space, Sp, may be filled with at least one of dry air, nitrogen, argon, xenon, krypton, or mixtures thereof. Generally, the internal space, Sp, may be filled with at least one of dry air, argon or a mixture of air and argon. The advantage of the present invention, is that the heat insulation performances of the glazing is less sensitive to the gas content within the internal space thanks to the presence of the VIG. In consequence, gas loss over the lifetime of the glazing does not significatively impact its heat insulation function or thermal properties. For the same reason, another advantage is that thinner circumferential spacers forming smaller internal spaces Sp may be used than for standard multiple glazing without depreciating significantly the thermal performances of the glazing. Such assembly allows for the width of the rabbet to be reduced as compared to a standard triple glazing, for an improved thermal performance, and so reduced overall cost.

The circumferential spacer frame may have adhesive properties, such that it adheres directly to the glass pane faces in contact with it. For instance, polyisobutylene-butyl mixture (also known as thermoplastic spacer or TPS) or butyl rubber seal, in extruded form, have intrinsic tightness and adhesion properties. They offer the advantage of allowing good adhesion to the glass panes, and to compensate for irregularities in the flatness of these panes, thus ensuring a good seal. They also offer the advantage to adapt to all possible shapes. To give such thermoplastic spacers or extruded butyl rubber seal a good UV resistance, and sufficient rigidity to maintain the distance between the glass panes, they are sometimes reinforced by various fillers, including carbon black, mineral powders such as glass powders.

In other instances where the circumferential spacer frame does not have adhesive properties, a circumferential seal is required.

The circumferential seal is positioned around the internal space, providing the tightness and contributing to the mechanical strength of the construction. The circumferential seal may be a combination of at least two different seals. A first circumferential seal may be present at each interface between the circumferential spacer and the glass planes, and serve for the adhesion of the spacer to the glass panes. This first circumferential seal may serve for air and water vapor tightness. A second circumferential seal may be present between the two glass sheets and cover the glazing spacer and first peripheral seal towards the exterior. This second circumferential seal may serve for the air tightness of the internal space and for mechanical support of the glazing. The second circumferential seal typically has a very good mechanical strength, in addition to properties of water tightness and airtightness and of adhesion to the glass.

The circumferential seal may be opaque or transparent, or translucent.

Examples of first circumferential seal materials include polyisobutylene, silicone, acrylic resin, epoxy resin, polyurethane resin, and mixtures or combinations thereof.

Examples of second circumferential seal materials include polyisobutylene, silicone, polysulfide, polyurethane or mixtures or combinations thereof.

The first and second circumferential seals may be respectively the same or different from the first and second peripheral seals of the peripheral spacer of the IU discussed above.

Some resins such as polyisobutylene may be suitable as first circumferential seal or as second circumferential seal depending on their molecular weight, as is well known by the skilled person in the art.

The process of mounting the VIG and insulting glazing units is equivalent to standard mounting methods used for typical multiple glazing systems, and will not be described herein.

Figure 1B:
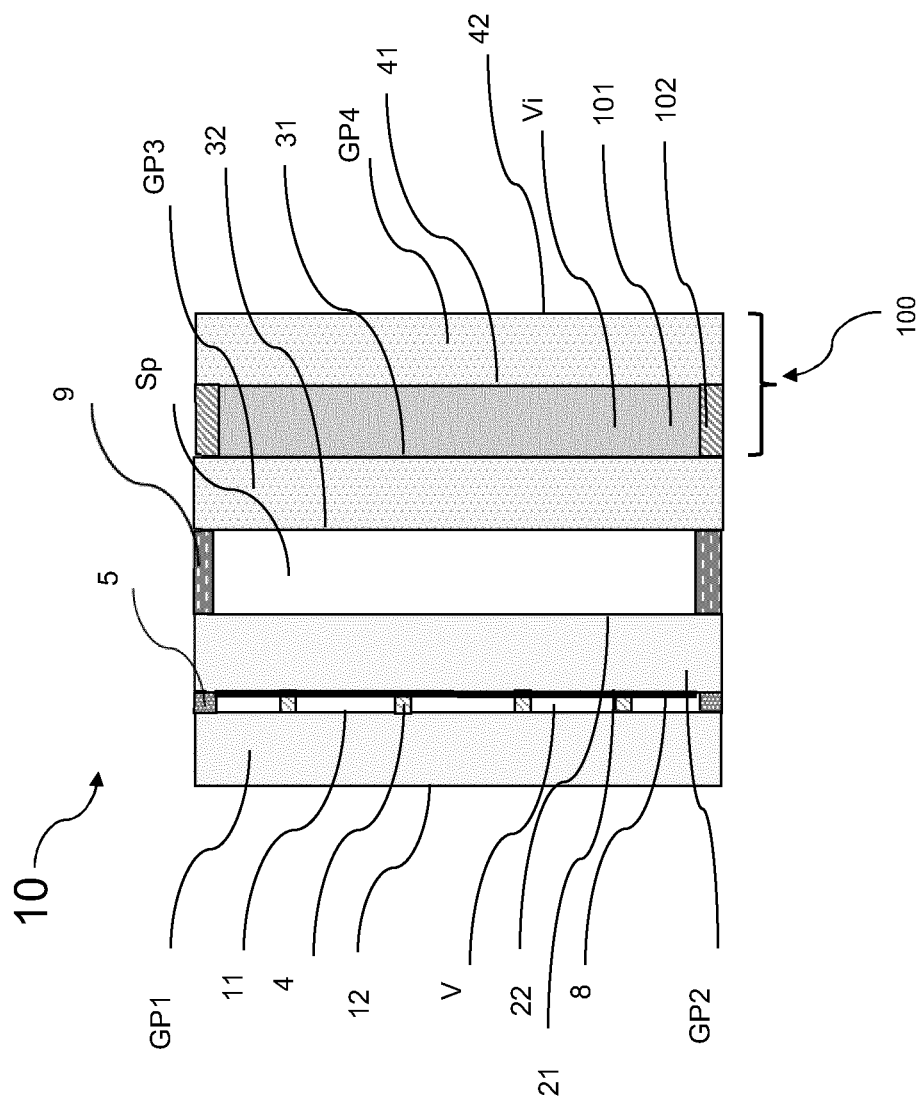

FIGS. 1a and 1b provide for illustrations of an embodiment of the invention wherein a FR-VIG (10) comprises one VIG, a third glass pane GP3 and one IU (100). The VIG comprises a first glass pane GP1 having an inner pane face (11) and an outer pane face (12) and a second glass pane GP2 having an inner pane face (21) and an outer pane face (22). The inner pane face (21) of GP2 is provided with a coating (8). The VIG further comprises a set of discrete pillars (4) positioned between GP1 and GP2, maintaining a distance between them and a hermetically bonding seal (5) sealing the distance between GP1 and GP2 over a perimeter thereof. An internal volume, V, is defined by GP1 and GP2 and closed by the hermetically bonding seal (5). The inner pane faces (11, 21) face the internal volume, V.

The intumescent unit (100) comprises a fourth glass pane GP4 having an inner pane face (41) and an outer pane face (42) and a layer of intumescent material (101) that is in contact with the inner pane faces (31) and (41) of GP3 and GP4.

The FR-VIG (10) comprises a circumferential spacer frame (9) optionally comprising a peripheral seal (not shown) between the outer pane face (22) of GP2 and the outer pane face (32) of GP3, defining an internal space, Sp.

FIG. 1a specifically provides for a FR-VIG (10) comprising a VIG and one IU (100), wherein the layer of intumescent material (101) in IU (100), is devoid of an encompassing peripheral spacer, according to the first alternative of the invention.

FIG. 1b specifically provides for a FR-VIG (10) comprising a VIG and one IU (100), wherein the layer of intumescent material (101) in IU (100), is encompassed by peripheral spacer (102) over a perimeter thereof, according to the second alternative of the invention.

The construction of the present assembly allows to join an existing VIG to an existing fire resistant glazing, optionally in a location which is the same or different from where the individual glazings are being processed.

The construction of the present assembly further allows for refurbishment or restoration options of existing fire resistant glazing mounted in a multiple glazing configuration, be it double or triple glazing. Indeed, in such an existing fire resistant assembly, the external sheet of the double glazing unit, may be replaced by a VIG unit to provide for the present FR-VIG assembly. In such instances, the glass sheet of an existing fire resistant glazing may thus be replaced by a VIG. The circumferential spacer frame may then be provided in a thickness such that the internal space, Sp, is thinner than in the initial fire resistant glazing mounted in double glazing, since thermal insulation will mainly be provided for by the VIG unit. Such option may provide for improved thermal performance, as compared to the initial existing fire resistant assembly. When an existing fire resistant glazing is mounted in a triple glazing configuration, it can be advantageously replaced by a FR-VIG assembly such as illustrated in FIGS. 1a and 1b with a total glazing thickness reduction and improved thermal performances. Such assembly allows for the width of the rabbet to be reduced as compared to a triple glazing configuration, for an improved thermal performance, and so reduced overall cost.

In some embodiments of the invention, the present FR-VIG may comprise more than one intumescent unit, such that the FR-VIG assembly may comprise from 1 to 15 intumescent unit(s), preferably from 1 to 6 intumescent unit(s).

Figure 2A:
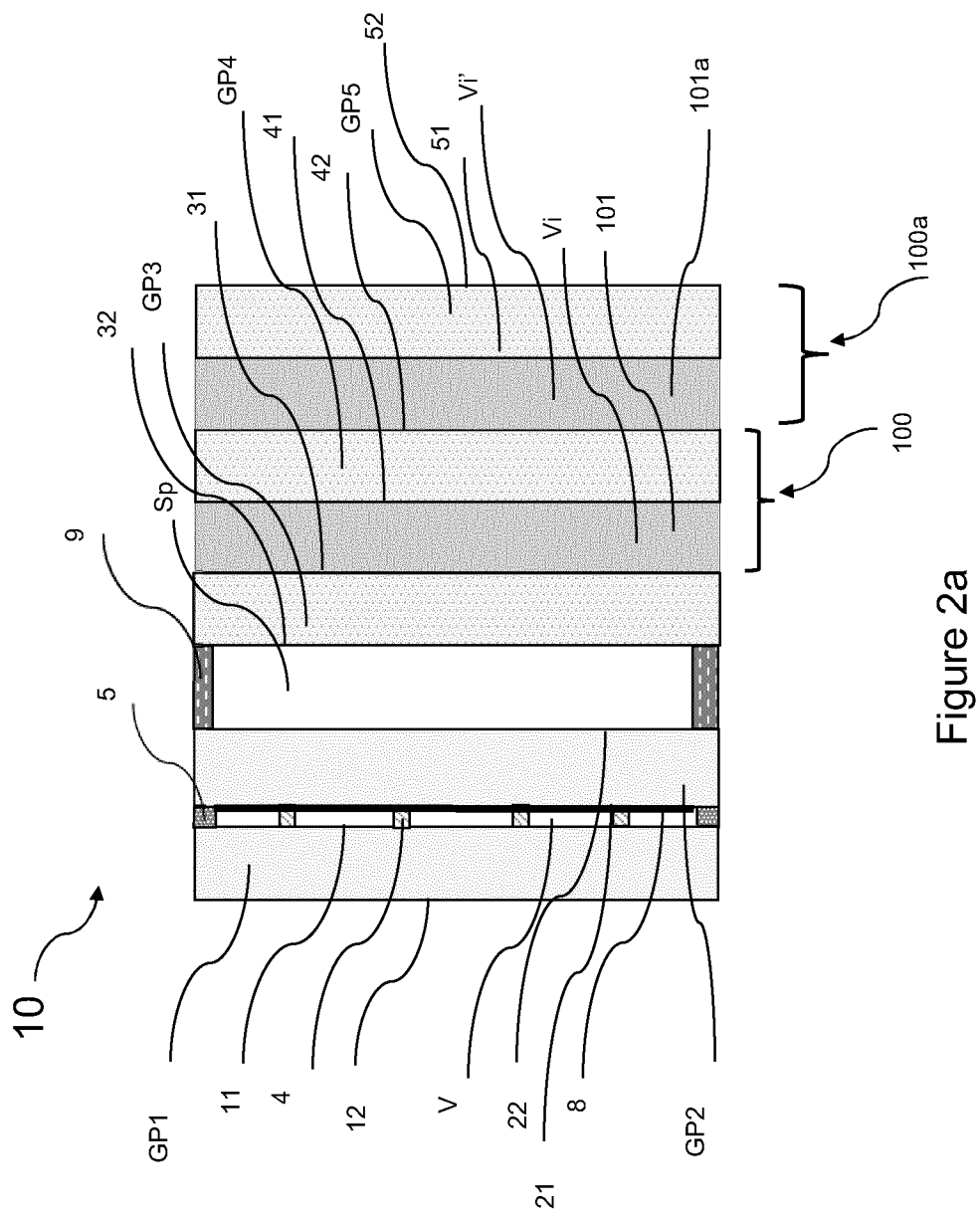
FIGS. 2a and 2b show a cross sectional view of a fire resistant vacuum insulating glazing assembly according to further embodiments of the present invention, comprising one vacuum insulating glazing unit and two intumescent glazing units.
Figure 2B:
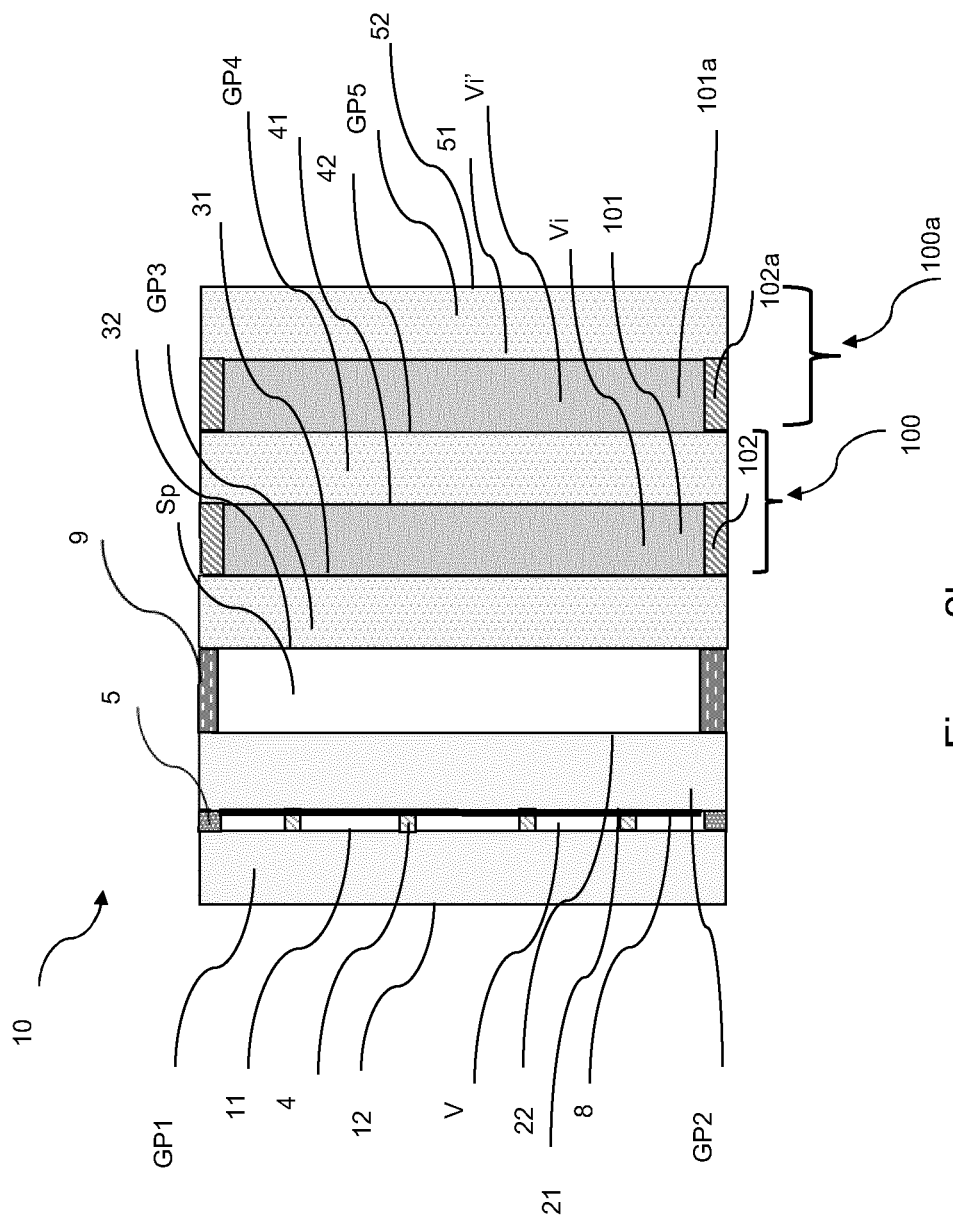

FIGS. 2a and 2b provide for illustrations of embodiments of the invention, wherein the FR-VIG (10) comprises one VIG, one IU (100), one third pane GP3, and a circumferential spacer frame (9) as already described with reference to FIGS. 1a and 1b. The FR-VIG further comprises an additional intumescent unit IIIa (100a) comprising a layer of intumescent material (101a) and an IIIa glass pane (GP5), wherein the layer of intumescent material (101a) is in contact on one side with the outer pane face (42) of GP4 and on the other side, with the inner pane face (51) of GP5.

FIG. 2a specifically provides for a FR-VIG (10) wherein the layer of intumescent material (101) in IU (100) and (101a) in IIIa (100a), each are devoid of an encompassing peripheral spacer, according to the first alternative of the invention.

FIG. 2b specifically provides for a FR-VIG (10) wherein the layers of intumescent material (101) in IU (100) and (101a) in IIIa (100a), each are encompassed by a peripheral spacer (102, 102a) over a perimeter thereof, according to the second alternative of the invention.

Figure 3:
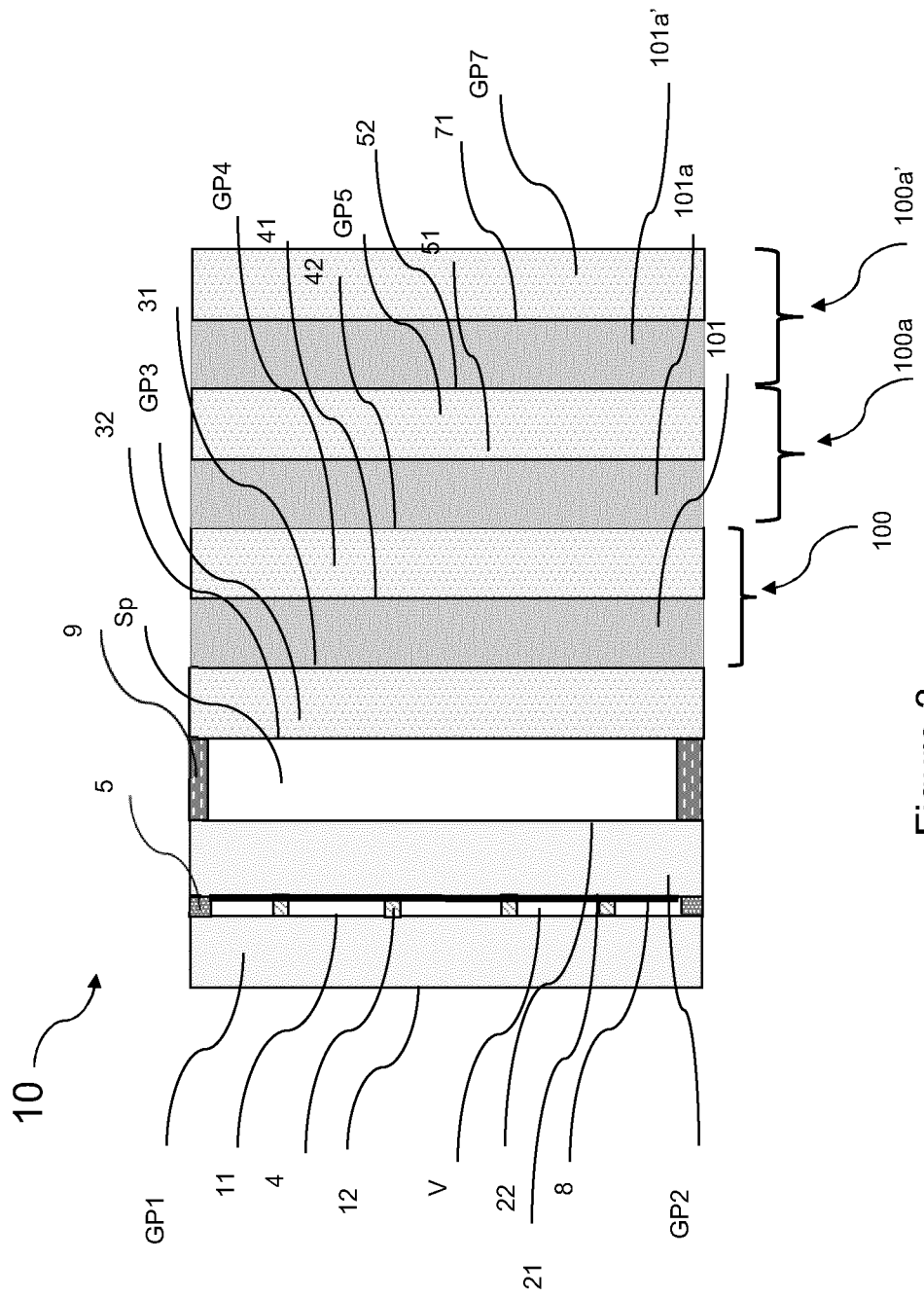
FIG. 3 shows a cross sectional view of a fire resistant vacuum insulating glazing assembly according to a further embodiment of the present invention, comprising one vacuum insulating glazing unit and three intumescent glazing units.

FIG. 3 provides for an illustration of an embodiment of the invention, wherein the FR-VIG (10) comprises one VIG, one IU (100), one third pane GP3 and a circumferential spacer frame (9) as already described with reference to FIGS. 1a and 1b. The FR-VIG further comprises two additional IIIa (100a and 100a') comprising 2 layers of intumescent material (101a) and (101a'), and two IIIa glass panes (GP5) and (GP7), wherein the layer of intumescent material (101a) is in contact on one side with the outer pane face (42) of GP4 and on the other side, with the inner pane face (51) of GP5, while the layer of intumescent material (101a') is in contact on one side with the outer pane face (52) of GP5 and on the other side, with the inner pane face (71) of GP7.

FIG. 3 thus provides for an embodiment where the FR-VIG (10) comprises one VIG, a third glass pane GP3, three intumescent units, and a circumferential spacer frame (9), and where the layers of intumescent material each are devoid of an encompassing peripheral spacer. This does not exclude embodiments where the layers of intumescent material each comprise an encompassing peripheral spacer over a perimeter thereof.

In the embodiments of the invention where the FR-VIG comprises more than 1 intumescent units, the layers of intumescent materials can be the same or different. A few non exhaustive examples of the use of different layers of intumescent materials are FR-VIG with layers of hydrated alkali metal silicates of different compositions, FR-VIG with layers of organic hydrogels of different compositions, FR-VIG with some layers of hydrated alkali metal silicates and some of organic hydrogels. In some instances when several intumescent units are present, the layers of intumescent materials may each comprise an encompassing peripheral spacer over a perimeter thereof. In other instances when several intumescent units are present, the layers of intumescent materials may all be devoid of an encompassing peripheral spacer over a perimeter thereof. In yet other instances, when several intumescent units are present, some layers of intumescent materials may comprise an encompassing peripheral spacer over a perimeter thereof while some of the layers of intumescent materials may be devoid of an encompassing peripheral spacer over a perimeter thereof.

In the embodiments of the present invention where the FR-VIG comprises more than 1 intumescent units, all the intumescent units are preferably facing the same glass pane of the VIG. In other words, the VIG is preferably not sandwiched between intumescent units.

This is of particular interest when the FR-VIG is used to close an opening within a wall. This wall separates an exterior space from an interior space, typically a wall separating the exterior atmosphere from the interior space of a building. Indeed, in this case, the intumescent unit(s) must be protected from the external environment and from high and/or low temperatures (outside weather conditions) and hence the FR-VIG is preferably positioned such that the intumescent units are facing the interior space and the VIG is facing the exterior atmosphere. For the same reason, a FR-VIG comprising a single intumescent unit used to close an opening of partition separating the exterior atmosphere from the interior space of a building is preferably positioned with the intumescent unit facing the interior space and the VIG facing the exterior atmosphere.

In some embodiments, the FR-VIG of the invention may also comprise at one or both extremities one or more additional glass panes laminated by polymer interlayer(s). This is particularly advantageous to improve safety performances such as anti-burglary and anti-bullet performances, protection against defenestration.

Figure 4A:
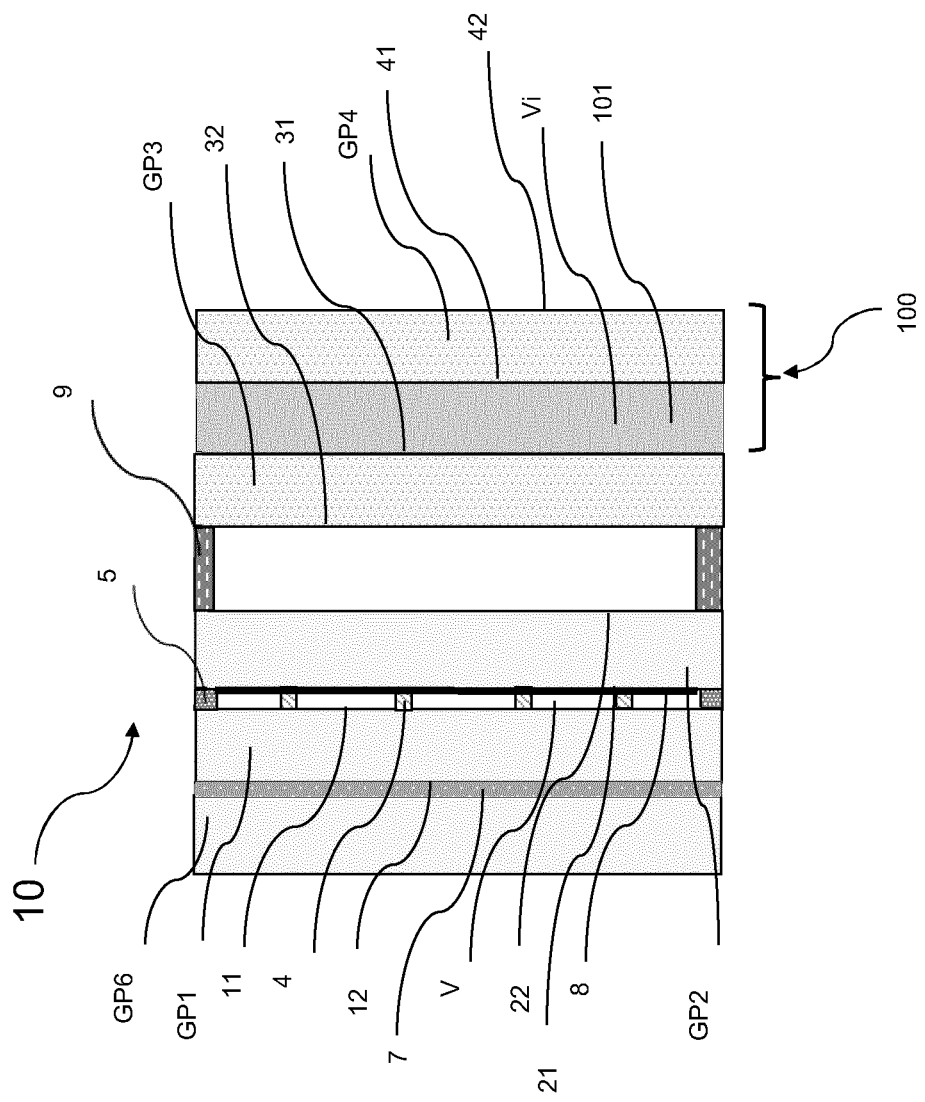
FIGS. 4a and 4b show a cross sectional view of a fire resistant vacuum insulating glazing assembly according to embodiments of the present invention, comprising one intumescent glazing unit and one vacuum insulating glazing unit with an additional glass pane laminated to the vacuum insulating glazing unit.

FIG. 4a provides an illustration of an embodiment of the invention, wherein the FR-VIG (10) comprises a VIG, a third glass pane GP3, an IU (100) wherein the layer of intumescent material (101) is devoid of an encompassing peripheral spacer over a perimeter thereof, and a circumferential spacer frame (9) as already described with reference to FIG. 1a. The VIG further comprises an additional glass pane GP6, laminated to the outer pane face (12) of glass pane GP1 by a polymer interlayer (7).

Figure 4B:
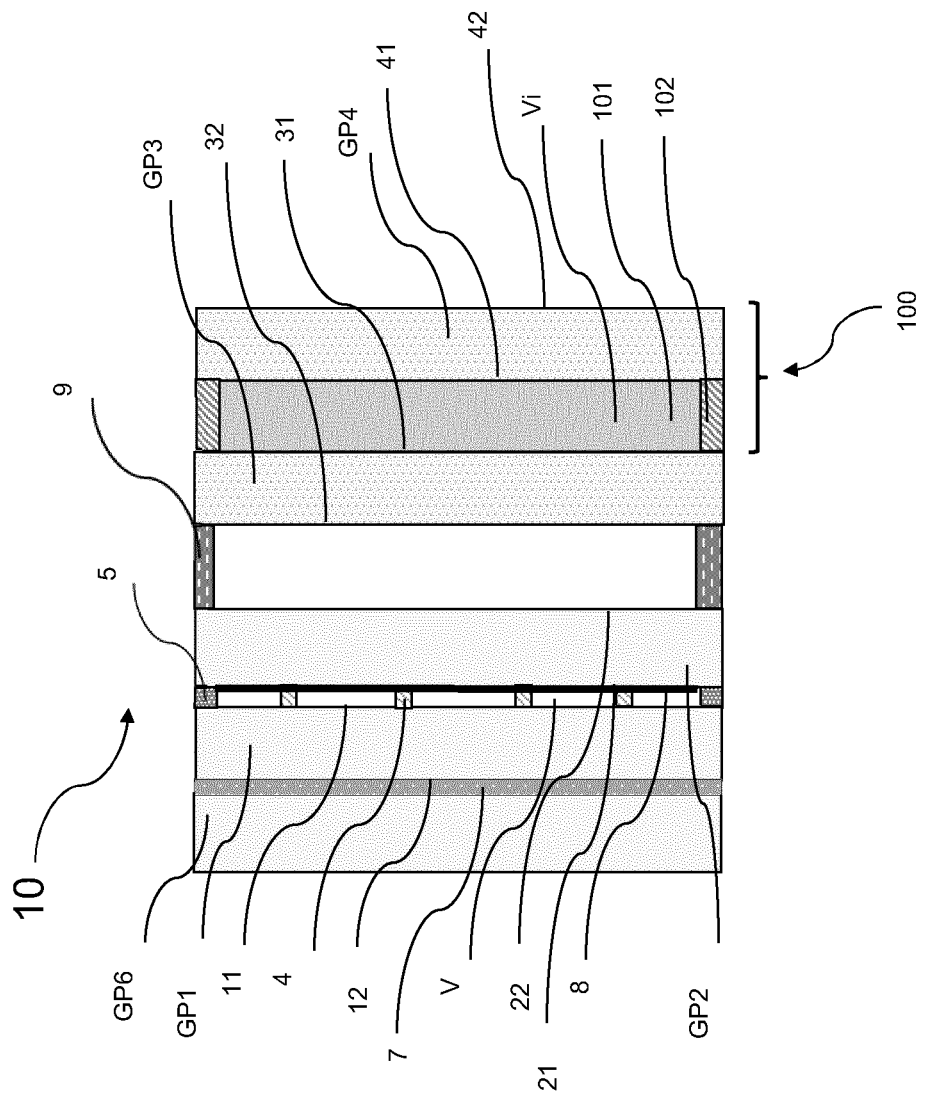

FIG. 4b provides an illustration of an embodiment of the invention, wherein the FR-VIG (10) comprises a VIG, a third glass pane GP3, an IU (100) wherein the layer of intumescent material (101) is encompassed by a peripheral spacer (102) over a perimeter thereof, and a circumferential spacer frame (9) as already described with reference to FIG. 1b. The VIG further comprises an additional glass pane GP6, laminated to the outer pane face (12) of glass pane GP1 by a polymer interlayer (7).

The advantage of such constructions comprising an additional laminated glass pane GP6, includes the reaching of a higher class of safety glazing by the mechanical reinforcement of the glazing according to EN12600 (European Standard for Safety Glazing). A further advantage is the improved absorption of the mechanical stress between the components in case of warpage.

The polymer interlayer typically comprises a material selected from the group consisting of ethylene vinyl acetate (EVA), polyisobutylene (PIB), polyacetals such as polyvinyl butyral (PVB), polyurethane (PU), polyvinyl chloride (PVC), polyesters, cyclo olefin polymers (COP), ionomers and/or ultraviolet curable adhesives, and others known in the art of manufacturing glass laminates. Blended materials using any compatible combination of these materials can be suitable as well. Preferably, the polymer interlayer comprises a material selected from the group consisting of ethylene vinyl acetate and/or polyvinyl butyral. More preferably, the polymer interlayer comprises a material capable of being processed at lower pressure, such as ethylene vinyl acetate.

The polymer interlayer acts as a "bonding interlayer" since the polymer interlayer and the glass pane form a bond that results in adhesion between the glass pane and the polymer interlayer.

The polymer interlayer to be used in the present invention may be a transparent or translucent polymer interlayer. However, for decorative applications, the polymer interlayer may be colored or patterned.

Typical thicknesses for the polymer interlayer are 0.15 mm to 3.5 mm, preferably 0.30 mm to 1.75 mm, more preferably from 0.5 mm to 1.75 mm. Usual commercially available polymer films are polyvinyl butyral (PVB) layers of 0.38 mm and 0.76 mm, 1.52 mm, 2.28 m and 3.04 mm. To achieve the desired thickness, one or more of those films can be used.

Reinforced acoustic insulation can be provided by using a polymer interlayer with specific acoustic performance, such as specific PVBs, is used: e.g. Saflex® acoustic PVB interlayer from Eastman or Trosifol® acoustic PVB layer from Kuraray.

By appropriately selecting the polymer interlayer, UV protection of the layer of intumescent material may also be provided.

If several polymer interlayers are present in the FR-VIG, they can be made of the same or different materials. For practical reasons, they preferably are made of the same material.

In some embodiments, compatible with all previously discussed embodiments, at least one glass pane of the FR-VIG assembly may be a laminated glass pane. Said glass pane may be either one of glass pane GP1, GP2, GP3 or GP4, preferably, the laminated glass pane is the third glass pane GP3.

Figure 5:
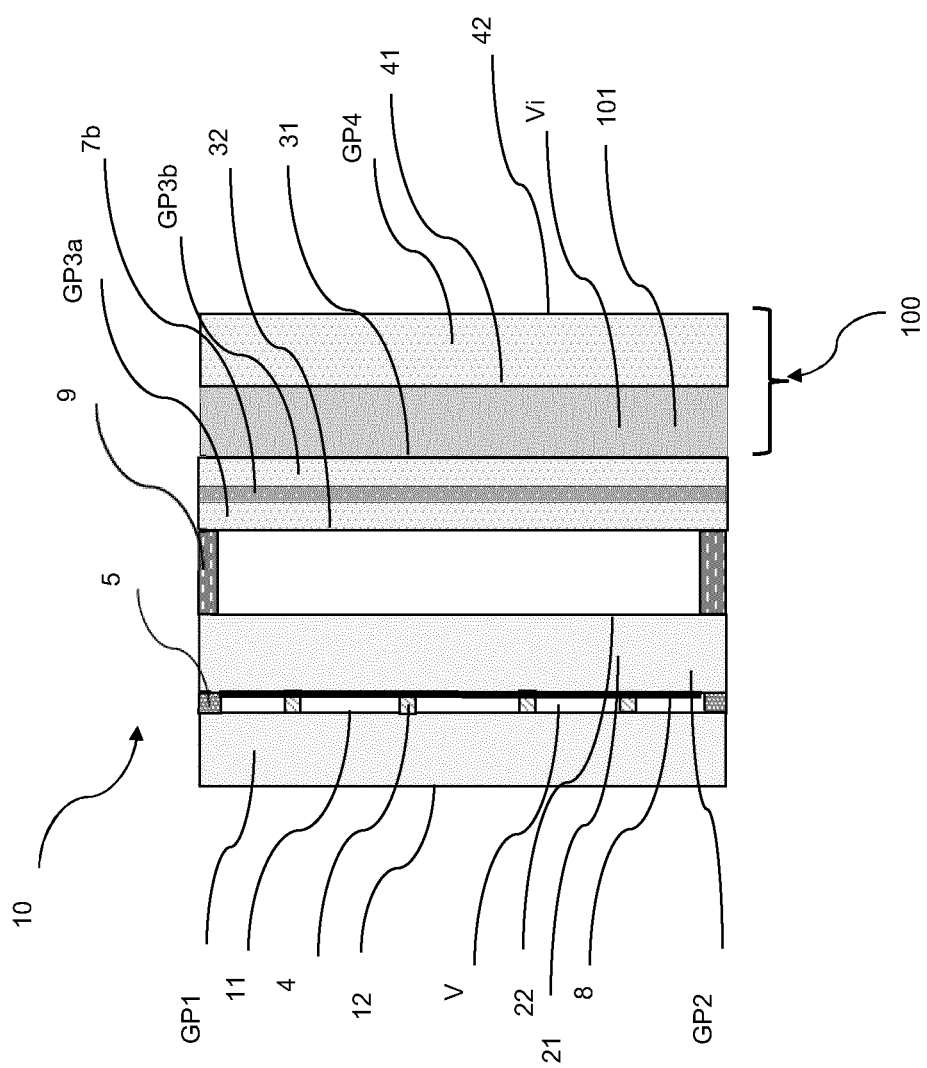
FIG. 5 shows a cross sectional view of a fire resistant vacuum insulating glazing assembly according to a further embodiment of the present invention, comprising one vacuum insulating glazing unit and one intumescent glazing unit, wherein the third glass pane GP3 is a laminated glass pane.

FIG. 5 provides an illustration of an embodiment of the invention, wherein the FR-VIG (10) comprises one VIG, a third glass pane GP3, one IU (100), and a circumferential spacer frame (9), wherein the third glass pane GP3 is a laminated glass pane, comprising two plies of glass GP3a and GP3b laminated with a polymer interlayer (7b), wherein the polymer interlayer may optionally provide for UV protection of the intumescent material (101), here devoid of an encompassing peripheral spacer over a perimeter thereof.

In some embodiments of the present invention, compatible with all previously discussed embodiments, at least one pane face of the glass panes of the assembly may be provided with a functional coating. By functional coating is meant a coating which enhances or modifies the properties of the glass substrate and offers several crucial properties, such as anti-reflective, low emissivity, chemical resistance, UV protection, scratch resistance, wear resistance, gloss, hydrophobicity, self-cleaning, anti-static, and/or anti-bacterial properties, to the glass substrate. Typically, a functional coating suitable for the present invention will comprise at least one layer of metal or of oxide, (oxy)nitride, sulfide or carbide of metal, deposited on the glass pane face by typical deposition methods such as CVD, PECVD, PVD, or magnetron sputtering. The functional coating may be a transparent coating having a light transmission >50%. In the particular case where a functional coating would be in contact with the layer of intumescent material, suitable coatings are those being compatible with the layer of intumescent material. For instance compatible with the strongly alkaline or acidic character of such compositions.

Examples of functional coating include infrared-reflective coatings comprising at least one silver-based layer, low emissivity coatings, antireflective coatings. Such coatings are present in the Figures as reference 8, on the inner pane face 21, of glass pane GP2. Other options include having a coating on the outer pane face (32) of glass pane GP3, and/or on the outer pane face (22) of glass pane GP2.

The functional coating may be selected from a low emissivity coating, an infrared reflective coating, or an antireflective coating.

One major advantage of the present invention is that more than one functional coating may be present on the glass panes, such that thermal performance may be optimized. Other functionalities may also be envisaged for hydrophobicity, UV protection, among others. When compared to a fire resistant glazing mounted in a double glazing configuration, the FR-VIG assembly of the invention provides two additional pane faces that are available to receive functional coatings.

For example, a UV protective coating may be provided on any of GP1, GP2, GP3 or GP4. Examples of UV protective coating includes those functional coatings which reflect UV rays, and those which absorb UV rays, at wavelengths of 250 to 400 nm. Examples of such UV protective coatings includes these consisting essentially of an oxide and/or nitride of one or more of titanium, vanadium, chromium, zirconium, niobium, tantalum, and tungsten; or consisting in an alternating arrangement of high and low refractive index layers, where high is typically >2.0 and low is typically <1.7, optionally patterned. Such a UV protective coating allows for the protection of the intumescent layer of the first alternative of the invention, and as such, for an improved optical stability, without requiring the use of a polymer interlayer when the other properties of such interlayer are not necessary, decreasing hence the cost and the thickness of the final structure.

As a further example a low emissivity coating or an infrared reflective coating may be provided on any of GP1, GP2, GP3 or GP4. Such functional coatings allows for the protection of the intumescent layer of the second alternative of the invention against lower or higher temperatures.

The layer of intumescent material of the FR-VIG according to the first alternative of the invention is typically obtained by a process comprising the steps of:
preparing an intumescent material precursors mixture
applying the intumescent material precursors mixture on a glass pane of the intumescent unit of the FR-VIG positioned in a horizontal position,
drying the intumescent material precursors mixture to form the layer of intumescent material having a first side in contact with said glass pane.

The step of preparing an intumescent material precursors mixture may be performed by any method known to the skilled person. The precursors may for instance be introduced via flow meters into a mixing tank.

The intumescent material precursors mixture may be a hydrated alkali metal silicate precursors mixture or an organic hydrogel precursors mixture or a mixture comprising both hydrated alkali metal silicate precursors and organic hydrogel precursors. This process is particularly suitable for hydrated alkali metal silicate precursors mixtures.

In the case of a hydrated alkali metal silicate precursors mixture, the mixture may for instance be prepared starting from commercial aqueous solutions of alkali metal silicates or from mixtures of colloidal silica added with alkali hydroxides or both of them.

The hydrated alkali metal silicates are those described supra with reference to the first alternative of the invention. The mixtures of colloidal silica with alkali hydroxides may have a substantially lower water content than that of the industrial silicates and so a much higher $SiO_2/M_2O$ ratios. Their use may hence advantageously reduce the drying time and offer a better refractory behavior in case of fire. Nevertheless, for economic reasons, it is preferred to use industrial alkali metal silicates added with colloidal silica if mixtures having high molar ratios are desired, without the need to eliminate an excessive quantity of water.

When mixtures of colloidal silica and alkali hydroxides are used, the properties of the intumescent material precursors mixture depends on the particles size. In general, an increase of the particle size within certain limits makes it possible to delay the undesired caking of the mixture before its application on a glass pane of the assembly. In other words, increasing the silica particle size allows to maintain the required viscosity of the intumescent material precursors mixture for further processing.

Obviously, the increase in particle size is limited since beyond a certain dimension, the mixtures no longer exhibit the required optical properties, and in particular transparency. Too large dimensions of the silica particles lead to a diffusion of light, and to the formation of a haze. In practice, the silica particles used for the formation of the silicate precursors mixture have an average diameter of not less than 40 nm and preferably not less than 50 nm. These particles also have average dimensions which do not exceed advantageously 150 nm and preferably not 130 nm. The particularly preferred average diameter is between 60 nm and 120 nm.

The molar ratio $SiO_2/M_2O$ of the hydrated alkali metal silicate precursors mixture is also as described supra for the layer of hydrated alkali metal silicate composition.

The water content of the hydrated alkali metal silicate precursors mixture typically ranges from 40 to 65 wt % on the weight of the mixture.

Polyols are generally added in the hydrated alkali metal silicate precursors mixtures at a concentration not greater than 15 wt %, preferably not greater than 10 wt % on the weight of the mixture. Preferred polyols are glycols, especially ethylene glycol or glycerin.

Traditionally, the hydrated alkali metal silicate precursors mixture also comprises other additives in small proportions such as nitrogen products (urea, amines . . . ), surfactants or adhesion promoters such as silanes and functionalized silanes such as amino-silanes as described supra in connection with the hydrated alkali metal silicates composition. Advantageously, the precursors mixture contains tetramethyl ammonium hydroxide (TMAH) at a content of at most 1.5 wt % on the weight of the mixture.

An optional step of dehydration of the intumescent material precursors mixture may take place between the step of preparing the mixture and the step of applying the mixture on a glass pane of the assembly in order to reduce the amount of water of the mixture. This dehydration step is different from the drying step that will occur after the application of the mixture on the horizontal glass pane.

The mixture after the dehydration, is sufficiently stable at ordinary ambient temperature conditions. It can be stored for several hours, or even days if necessary by cooling, without the risk of formation of a gel. It is possible to use this stability to eliminate bubbles that may have appeared during the preparation of the mixture.

In a subsequent step, the intumescent material precursors mixture is applied on a glass pane of the assembly placed in horizontal position.

The step of drying the intumescent material precursors mixture is generally performed by introducing the glass pane provided with the intumescent material precursors mixture in a heated chamber under controlled conditions of temperature and humidity. The drying time may vary depending on the drying conditions, it generally ranges from a few hours to 48 h. The drying time is not only expensive but it also influences the quality of the products obtained. At temperatures of the order of one hundred ° C., prolonged contact of the glass sheets and strongly alkaline compositions can lead to a surface attack of the glass. The drying may also be done by placing the coated glass pane on a conveyer moving in an oven such as a heated tunnel. The drying is performed until a layer of intumescent material is formed that has its first side in contact with said glass pane of the assembly.

In a particular embodiment, the layer of intumescent material may be composed of several sub-layers obtained from intumescent material precursors mixtures that may be the same or different. A few non exhaustive examples of a layer of intumescent material composed of sub-layers that are different are a layer composed of:
sub-layers of hydrated alkali metal silicates of different compositions,
sub-layers of organic hydrogels of different compositions,
sub-layer(s) of hydrated alkali metal silicates and sub-layer(s) of organic hydrogels.

The first sub-layer is formed on one glass pane of the assembly, the following one(s) are successively formed on the preceding one.

The layer of intumescent material of the FR-VIG according to the second alternative of the invention is typically obtained by a process comprising the steps of:
preparing an intumescent material precursors mixture,
pouring the mixture into the intumescent unit volume, Vi,
hardening the mixture to form the layer of intumescent material.

As previously described, the intumescent material precursors mixture may be a hydrated alkali metal silicate precursors mixture or organic hydrogel precursors mixture. This process is particularly suitable for hydrated alkali metal silicate precursors mixtures.

The step of preparing an intumescent material precursors mixture may be performed by any method known to the skilled person. The composition of the intumescent material precursors mixture is as described supra with reference to second alternative of the invention. The precursors may for instance be introduced via flow meters into a mixing tank.

The process may optionally comprise a partial dehydration step of the mixture between the step of preparing the mixture and the step of pouring it into the intumescent unit volume. This step aims at reaching a suitable water content in the intumescent material precursors mixture as described supra.

The mixture after the optional dehydration is sufficiently stable at ordinary ambient temperature conditions. It can be stored for several hours, or even days if necessary by cooling, without the risk of formation of a gel. It is possible to use this stability to eliminate bubbles that may have appeared during the preparation of the mixture. The removal of bubbles can take place simply by leaving the mixture at rest or by any known technique such as the use of ultrasound or degassing under partial pressure, for example.

In a next step, the mixture is poured into the intumescent unit volume, Vi, that will later encompass the layer of intumescent material. The peripheral spacer tightly adheres on the third GP3 and the fourth GP4 glass panes.

A typical distance separating the two glass panes is from 2 to 30 mm, preferably from 3 to 15 mm, more preferably from 3 to 8 mm.

The peripheral spacer typically comprises an opening to allow pouring the intumescent material precursors mixture into the intumescent unit volume. After the necessary quantity has been introduced, the mixture is then distributed or spread throughout the intumescent unit volume for instance thanks to a rotating table. The opening is then closed and sealed.

The intumescent material precursors mixture is then hardened, which hardening does not include drying. The hardening may for instance be performed in an oven at typically 60-90° C. for several hours to obtain a gel with sufficient hardness and form the layer of intumescent material.

In this process, the formed layer of intumescent material is encompassed by the peripheral spacer and consequently the layer of intumescent material does not extend up to the edges of the glass panes.

The present invention also relates to the use of at least one vacuum insulating glazing unit in a fire resistant glazing assembly to improve thermal performance (U value) together with the fire resistance, where the fire resistant glazing assembly is a multiple glazing assembly comprising an internal space, Sp.

The present invention thus relates to the use of at least one vacuum insulating glazing unit in a fire resistant glazing assembly to improve thermal performance (U value) together with the fire resistance, where the fire resistant glazing assembly is a multiple glazing assembly comprising an internal space, Sp, wherein the fire resistant vacuum insulating glazing assembly (10) comprises:
i. at least one vacuum insulating glazing unit comprising:
a. a first glass pane, GP1, having an inner pane face (11) and an outer pane face (12) and a second glass pane, GP2, having an inner pane face (21) and an outer pane face (22);
b. a set of discrete pillars (4) positioned between the first and second glass panes, maintaining a distance between the first and the second glass panes;
c. a hermetically bonding seal (5) sealing the distance between the first and second glass panes over a perimeter thereof;
d. an internal volume, V, defined by the first and second glass panes and closed by the hermetically bonding seal; wherein there is a vacuum of absolute pressure of less than 0.1 mbar; and wherein the inner pane faces face the internal volume, V;
and
ii. a third glass pane, GP3, having an inner pane face (31) and an outer pane face (32), and
iii. at least one intumescent glazing unit (100) comprising:
a fourth glass pane, GP4, having an inner pane face (41) and an outer pane face (42),
a layer of intumescent material (101) positioned between the inner pane faces (31, 41) of said third and fourth glass panes GP3 and GP4;
and
iv. a circumferential spacer frame (9) positioned between the outer pane face (22) of the second glass pane GP2 and the outer pane face (32) of the third glass pane GP3 over a perimeter thereof, and maintaining a distance there between and,
wherein the circumferential spacer frame, the outer pane face (22), and the outer pane face (32) define said internal space, Sp.

Evaluations according to EN 1363-1 and EN 1364-1 standards of the present fire resistant glazing assembly, show an increase of about 20% of fire resistance performance, as compared to a standard double glazing, showing a surprising synergistic effect.

The thermal performance is indicated by the thermal transmittance of the fire resistant vacuum insulating glazing assembly, also known as the U-value. The thermal transmittance is the rate of transfer of heat through a structure (which can be a single material or a composite), divided by the difference in temperature across that structure. The units of measurement are $W/m^2K$. The better-insulated a structure is, the lower the U-value will be. Thermal transmittance takes heat loss due to conduction, convection and radiation into account.

The presence of the vacuum insulating glazing unit in the present fire resistant vacuum insulating glazing assembly allows for the maintenance of the thermal performances of the glazing, even in case of gas lost from the internal space Sp. The construction of the multiple glass panes allows for the inclusion of functional coatings on one or more pane face(s).

The present invention also relates to a method to provide for a fire resistant vacuum insulating glazing assembly comprising the steps of:
1) providing for at least one vacuum insulating glazing unit comprising a second glass pane, GP2, having an outer pane face (22),
2) providing for at least one intumescent glazing module comprising a third glass pane, GP3, having an outer pane face (32), 3) and assembling the at least one vacuum insulating glazing unit and the at least one intumescent glazing module by virtue of a circumferential spacer frame (9) positioned between the outer pane face (22) of the second glass pane GP2 and the outer pane face (32) of the third glass pane GP3 over a perimeter thereof, and maintaining a distance there between, wherein the circumferential spacer frame, the outer pane face (22), and the outer pane face (32) define an internal space, Sp.

The at least one vacuum insulating glazing unit is that disclosed supra, and comprises:

a. a first glass pane, GP1, having an inner pane face (11) and an outer pane face (12) and a second glass pane, GP2, having an inner pane face (21) and an outer pane face (22);

b. a set of discrete pillars (4) positioned between the first and second glass panes, maintaining a distance between the first and the second glass panes;

c. a hermetically bonding seal (5) sealing the distance between the first and second glass panes over a perimeter thereof;

d. an internal volume, V, defined by the first and second glass panes and closed by the hermetically bonding seal; wherein there is a vacuum of absolute pressure of less than 0.1 mbar; and wherein the inner pane faces face the internal volume, V.

The at least one intumescent glazing module comprises the third glass pane and the at least one intumescent glazing unit disclosed supra, and thus comprises:

a. a third glass pane, GP3, having an inner pane face (31) and an outer pane face (32), and b. at least one intumescent glazing unit (100) comprising:
a fourth glass pane, GP4, having an inner pane face (41) and an outer pane face (42),
a layer of intumescent material (101) positioned between the inner pane faces (31, 41) of said third and fourth glass panes GP3 and GP4.

According to the first alternative discussed supra, the at least one intumescent glazing module comprises the third glass pane and at least one intumescent glazing unit disclosed supra, and thus comprises:

a. a third glass pane, GP3, having an inner pane face (31) and an outer pane face (32), and b. at least one intumescent glazing unit (100) comprising:
a fourth glass pane, GP4, having an inner pane face (41) and an outer pane face (42),
a layer of intumescent material (101) positioned between the inner pane faces (31, 41) of said third and fourth glass panes GP3 and GP4 devoid of an encompassing peripheral spacer.

According to the second alternative discussed supra, the at least one intumescent glazing module comprises the third glass pane and at least one intumescent glazing unit disclosed supra, and thus comprises:

a. a third glass pane, GP3, having an inner pane face (31) and an outer pane face (32), and b. at least one intumescent glazing unit (100) comprising:
a fourth glass pane, GP4, having an inner pane face (41) and an outer pane face (42),
a peripheral spacer defining an IU volume, Vi, between the inner pane faces (31, 41) of said third and fourth glass panes GP3 and GP4,
a layer of intumescent material (101) positioned between the inner pane faces (31, 41) of said third and fourth glass panes GP3 and GP4 in the Vi volume.

The assembling step of the method is the same as usually used to provide for multiple glazings, and known to the skilled person in the art.

The present method allows for the adjoining of a vacuum insulating glazing unit to an existing intumescent glazing module. Said intumescent glazing module may be already in place in a building or room, or it may also be awaiting to be positioned in its end location, as discussed above, and/or in the scope of refurbishment or restoration options.

Such method is thus useful in instances where an existing intumescent module requires repair, refurbishment, and/or transformation. By the addition of a vacuum insulating glazing unit to an intumescent glazing module, the thermal performance of the existing glazing is improved, such that the present fire resistant vacuum insulating glazing assembly has better thermal performances than the original glazing. Such addition allows for improvement with reduced cost in that only part of the glazing is modified while the existing intumescent module may remain the same.

A first method to provide for a fire resistant vacuum insulating glazing assembly may thus comprise the steps of 1) providing for at least one vacuum insulating glazing unit comprising
a. a first glass pane, GP1, having an inner pane face (11) and an outer pane face (12) and a second glass pane, GP2, having an inner pane face (21) and an outer pane face (22);
b. a set of discrete pillars (4) positioned between the first and second glass panes, maintaining a distance between the first and the second glass panes;
c. a hermetically bonding seal (5) sealing the distance between the first and second glass panes over a perimeter thereof;

2) providing for at least one intumescent glazing module comprising
a. a third glass pane, GP3, having an inner pane face (31) and an outer pane face (32), and
b. at least one intumescent glazing unit (100) comprising:—
a fourth glass pane, GP4, having an inner pane face (41) and an outer pane face (42),
a layer of intumescent material (101) positioned between the inner pane faces (31, 41) of said third and fourth glass panes GP3 and GP4, 3) and assembling the at least one vacuum insulating glazing unit and the at least one intumescent glazing module by virtue of a circumferential spacer frame (9) positioned between the outer pane face (22) of the second glass pane GP2 and the outer pane face (32) of the third glass pane GP3 over a perimeter thereof, and maintaining a distance there between, wherein the circumferential spacer frame, the outer pane face (22), and the outer pane face (32) define an internal space, Sp.

The at least one intumescent glazing module for this first method is typically obtained by the process as described above for the first alternative, comprising the steps of:

preparing an intumescent material precursors mixture,
applying the intumescent material precursors mixture on a glass pane of the intumescent unit of the FR-VIG positioned in a horizontal position,
drying the intumescent material precursors mixture to form the layer of intumescent material having a first side in contact with said glass pane.

According to this typical process to obtain the intumescent glazing module, the layer of intumescent material is typically devoid of an encompassing peripheral spacer.

A second method to provide for a fire resistant vacuum insulating glazing assembly may comprise the steps of
1) providing for at least one vacuum insulating glazing unit comprising
   a. a first glass pane, GP1, having an inner pane face (11) and an outer pane face (12) and a second glass pane, GP2, having an inner pane face (21) and an outer pane face (22);
   b. a set of discrete pillars (4) positioned between the first and second glass panes, maintaining a distance between the first and the second glass panes;
   c. a hermetically bonding seal (5) sealing the distance between the first and second glass panes over a perimeter thereof;
2) providing for at least one intumescent glazing module comprising
   a. a third glass pane, GP3, having an inner pane face (31) and an outer pane face (32), and
   b. at least one intumescent glazing unit (100) comprising:
      a fourth glass pane, GP4, having an inner pane face (41) and an outer pane face (42),
      a peripheral spacer defining an IU volume, Vi, between the inner pane faces (31, 41) of said third and fourth glass panes GP3 and GP4,
      a layer of intumescent material (101) positioned between the inner pane faces (31, 41) of said third and fourth glass panes GP3 and GP4 in the Vi volume;
3) and assembling the at least one vacuum insulating glazing unit and the at least one intumescent glazing module by virtue of a circumferential spacer frame (9) positioned between the outer pane face (22) of the second glass pane GP2 and the outer pane face (32) of the third glass pane GP3 over a perimeter thereof, and maintaining a distance there between, wherein the circumferential spacer frame, the outer pane face (22), and the outer pane face (32) define an internal space, Sp.

The at least one intumescent glazing module for this second method is typically obtained by the process as described above for the second alternative, comprising the steps of:
   preparing an intumescent material precursors mixture,
   pouring the mixture into the intumescent unit volume, Vi,
   hardening the mixture to form the layer of intumescent material.

CLAUSES

Clause 1 relates to a fire resistant vacuum insulating glazing assembly (10) comprising:
   i. at least one vacuum insulating glazing unit comprising:
      a. a first glass pane, GP1, having an inner pane face (11) and an outer pane face (12) and a second glass pane, GP2, having an inner pane face (21) and an outer pane face (22);
      b. a set of discrete pillars (4) positioned between the first and second glass panes, maintaining a distance between the first and the second glass panes;
      c. a hermetically bonding seal (5) sealing the distance between the first and second glass panes over a perimeter thereof;
      d. an internal volume, V, defined by the first and second glass panes and closed by the hermetically bonding seal; wherein there is a vacuum of absolute pressure of less than 0.1 mbar; and wherein the inner pane faces face the internal volume, V;
      and
   ii. a third glass pane, GP3, having an inner pane face (31) and an outer pane face (32), and
   iii. at least one intumescent glazing unit (100) comprising:
      a fourth glass pane, GP4, having an inner pane face (41) and an outer pane face (42),
      a layer of intumescent material (101) positioned between the inner pane faces (31, 41) of said third and fourth glass panes GP3 and GP4;
      and
   iv. a circumferential spacer frame (9) positioned between the outer pane face (22) of the second glass pane GP2 and the outer pane face (32) of the third glass pane GP3 over a perimeter thereof, and maintaining a distance there between and,
   wherein the circumferential spacer frame, the outer pane face (22), and the outer pane face (32) define an internal space, Sp.

Clause 2 relates to a fire resistant vacuum insulating glazing assembly according to clause 1, wherein the layer of intumescent material is selected from:
   a layer of hydrated alkali metal silicate composition,
   a layer of organic hydrogel,
   a layer comprising a hydrated alkali metal silicate composition and organic hydrogel, present in the form of a mixture or in the form of different sub-layers.

Clause 3 relates to a fire resistant vacuum insulating glazing assembly according to clause 1 or 2, wherein the layer of intumescent material is a layer comprising a hydrated alkali metal silicate composition having a molar ratio $SiO_2/M_2O$ preferably ranging from 2.5 to 8.

Clause 4 relates to a fire resistant vacuum insulating glazing assembly according to any one of clause 1 to 3, wherein the layer of intumescent material is a layer of hydrated alkali metal silicate having a water content ranging from 18 to 50 wt % on the total weight of the layer.

Clause 5 relates to a fire resistant vacuum insulating glazing assembly according to any one of clause 1 to 4, wherein the layer of intumescent material has a thickness ranging from 1 to 30 mm.

Clause 6 relates to a fire resistant vacuum insulating glazing assembly according to clause 1, wherein the at least one intumescent glazing unit, IU, further comprises a peripheral spacer (102) defining an IU volume, Vi, between the inner pane faces (31, 41) of said third and fourth glass panes GP3 and GP4, and wherein the layer of intumescent material (101) is positioned in the Vi volume.

Clause 7 relates to a fire resistant vacuum insulating glazing assembly according to clause 6, wherein the layer of intumescent material is selected from:
   a layer of hydrated alkali metal silicate composition,
   a layer of organic hydrogel,
   a layer comprising a hydrated alkali metal silicate composition and organic hydrogel, present in the form of a mixture.

Clause 8 relates to a fire resistant vacuum insulating glazing assembly according to clause 6 or 7, wherein the layer of intumescent material is a layer comprising a hydrated alkali metal silicate composition having a molar ratio $SiO_2/M_2O$ preferably ranging from 3 to 8.

Clause 9 relates to a fire resistant vacuum insulating glazing assembly according to any one of clause 6 to 8, wherein the layer of intumescent material is a layer of hydrated alkali metal silicate having a water content ranging from 35 to 48 wt % on the total weight of the layer.

Clause 10 relates to a fire resistant vacuum insulating glazing assembly according to any one of clause 6 to 9, wherein the layer of intumescent material has a thickness ranging from 2 to mm.

Clause 11 relates to a fire resistant vacuum insulating glazing assembly according to any one of the preceding clauses, wherein the circumferential spacer is selected from polymeric, metal, ceramic, glass, or combinations and composites thereof.

Clause 12 relates to a fire resistant vacuum insulating glazing assembly according to any one of the preceding clauses, wherein the circumferential spacer further comprises a circumferential seal.

Clause 13 relates to a fire resistant vacuum insulating glazing assembly according to any one of the preceding clauses, wherein the internal space, Sp, is filled with at least one of dry air, nitrogen, argon, xenon, krypton, or mixtures thereof.

Clause 14 relates to a fire resistant vacuum insulating glazing assembly according to any one of the preceding clauses, comprising from 1 to 15 intumescent unit(s).

Clause 15 relates to a fire resistant vacuum insulating glazing assembly according to any one of the preceding clauses, wherein at least one of the glass panes is a laminated glass pane.

Clause 16 relates to a fire resistant vacuum insulating glazing assembly according to any one of the preceding clauses, wherein the third glass pane GP3 is a laminated glass pane.

Clause 17 relates to a fire resistant vacuum insulating glazing assembly according to any one of the preceding clauses, wherein at least one of the glass pane face is provided with a functional coating (8).

Clause 18 relates to a fire resistant vacuum insulating glazing assembly according to any one of the preceding clauses, wherein the functional coating (8) is selected from a low emissivity coating, an infrared reflective coating, or an antireflective coating.

Clause 19 relates to a fire resistant vacuum insulating glazing assembly according to clause 1, wherein the layer of intumescent material is obtained by a process comprising the steps of:
 preparing an intumescent material precursors mixture,
 applying the intumescent material precursors mixture on a glass pane of the fire resistant vacuum insulating assembly positioned in a horizontal position,
 drying the intumescent material precursors mixture to form the layer of intumescent material, having a first side in contact with said glass pane.

Clause 20 relates to a fire resistant vacuum insulating glazing assembly according to clause 19, wherein the process to obtain the layer of intumescent material further comprises a partial dehydration step between the step of preparing the mixture and the step of applying the mixture on a glass pane of the fire resistant vacuum insulating assembly.

Clause 21 relates to a fire resistant vacuum insulating glazing assembly according to clause 6, wherein the layer of intumescent material is obtained by a process comprising the steps of:
 preparing an intumescent material precursors mixture,
 pouring the mixture into the intumescent unit volume, Vi,
 hardening the mixture to form the layer of intumescent material.

Clause 22 relates to the use of at least one vacuum insulating glazing unit in a fire resistant vacuum insulating glazing assembly to improve fire resistance, where the fire resistant vacuum insulating glazing assembly is a multiple glazing assembly comprising an internal space, Sp.

Clause 23 relates to the use of at least one vacuum insulating glazing unit in a fire resistant glazing assembly to improve thermal performance (U value) together with the fire resistance, where the fire resistant glazing assembly is a multiple glazing assembly comprising an internal space, Sp, wherein the fire resistant vacuum insulating glazing assembly (10) comprises:
 i. at least one vacuum insulating glazing unit comprising:
  a. a first glass pane, GP1, having an inner pane face (11) and an outer pane face (12) and a second glass pane, GP2, having an inner pane face (21) and an outer pane face (22);
  b. a set of discrete pillars (4) positioned between the first and second glass panes, maintaining a distance between the first and the second glass panes;
  c. a hermetically bonding seal (5) sealing the distance between the first and second glass panes over a perimeter thereof;
  d. an internal volume, V, defined by the first and second glass panes and closed by the hermetically bonding seal; wherein there is a vacuum of absolute pressure of less than 0.1 mbar; and wherein the inner pane faces face the internal volume, V;
 and
 ii. a third glass pane, GP3, having an inner pane face (31) and an outer pane face (32), and
 iii. at least one intumescent glazing unit (100) comprising:
  a fourth glass pane, GP4, having an inner pane face (41) and an outer pane face (42),
  a layer of intumescent material (101) positioned between the inner pane faces (31, 41) of said third and fourth glass panes GP3 and GP4;
  and
 iv. a circumferential spacer frame (9) positioned between the outer pane face (22) of the second glass pane GP2 and the outer pane face (32) of the third glass pane GP3 over a perimeter thereof, and maintaining a distance there between and,
wherein the circumferential spacer frame, the outer pane face (22), and the outer pane face (32) define said internal space, Sp.

EXAMPLES

Example 1

A fire resistant vacuum insulating glazing assembly comprising:
 i. at least one vacuum insulating glazing unit comprising:
  a. a first glass pane, GP1, having an inner pane face (11) and an outer pane face (12) and a second glass pane, GP2, having an inner pane face (21) and an outer pane face (22), each having a thickness of 6 mm;
  b. a set of discrete pillars (4) positioned between the first and second glass panes, maintaining a distance of 100 µm between the first and the second glass panes;
  c. a hermetically bonding seal (5) of glass frit sealing the distance between the first and second glass panes over a perimeter thereof;
  d. an internal volume, V, defined by the first and second glass panes and closed by the hermetically bonding seal; wherein there is a vacuum of absolute pressure of $10^{-6}$ mbar; and wherein the inner pane faces face the internal volume, V;

and
ii. a third glass pane, GP3, having an inner pane face (31) and an outer pane face (32), in the form of 2 glass plies each of 3 mm thickness, laminated with 2 sheets of PVB each of 0.38 mm thickness; and
iii. a first intumescent glazing unit (100) comprising:
a fourth glass pane, GP4, having an inner pane face (41) and an outer pane face (42) having a thickness of 8 mm,
a first layer of intumescent material (101) of hydrated alkali metal silicate composition positioned between the inner pane faces (31, 41) of said third and fourth glass panes GP3 and GP4, having a thickness of 1.5 mm;
iv. a second intumescent glazing unit (100a) comprising:
a fifth glass pane, GP5, having an inner pane face (51) and an outer pane face (52) having a thickness of 3 mm,
a second layer of intumescent material (101a) of hydrated alkali metal silicate composition positioned between the outer pane face (42) of said fourth glass pane GP4, and the inner pane face (51) of said fifth glass pane GP5, having a thickness of 1.5 mm; and
v. a circumferential spacer frame (9) made of aluminium, complemented with a first circumferential seal of butyl rubber and a second circumferential seal of silicone, positioned between the outer pane face (22) of the second glass pane GP2 and the outer pane face (32) of the third glass pane GP3 over a perimeter thereof, and maintaining a distance of 20 mm there between,
wherein the circumferential spacer frame, the outer pane face (22) and the outer pane face (32) define an internal space, Sp, filled with air, was mounted in an insulated steel frame and evaluated for its resistance to a fire according to EN 1363-1 and EN 1364-1 standards.

Comparative Example 1

A comparative example 1 was provided with a fire resistant glazing assembly comprising, in place of the VIG unit of Example 1, a single sheet of glass. The intumescent glazing units and the circumferential spacer frame (9) were the same as for Example 1, regarding thicknesses and materials considered. The internal space between the single sheet of glass and the outer pane face (22) of GP2 is similarly filled with air. The fire resistant glazing assembly was also similarly mounted in an insulated steel frame.

The results outlined in Table I indicate that the fire resistant vacuum insulating glazing assembly provides for more fire resistance than Comparative Example 1. Indeed, the FR-VIG of Example 1 is able to withstand fire exposure for a longer time, from either side of its assembly, as compared to Comparative Example 1, be it from the intumescent unit side, or from the VIG side. Additionally, thermal insulation as indicated by the U value is also showing improvement over Comparative example 1.

TABLE I

|  | Fire | Time (min) | U value (W/m²K) |
|---|---|---|---|
| Example 1a | VIG side | 48 | 0.7 |
| Example 1b | IU side | 46 | 0.7 |
| Comparative Example 1a | Glass side | 37 | 2.5 |
| Comparative Example 1b | IU side | 36 | 2.5 |

The person skilled in the art realizes that the present invention by no means is limited to the embodiments or Figures described above. On the contrary, many modifications and variations are possible within the scope of the appended claims. It is further noted that the invention relates to all possible combinations of features, and preferred features, described herein and recited in the claims. The Figures are not drawn to scale and are presented in an illustrative goal only.

NUMERAL REFERENCES

| Ref. # | Feature |
|---|---|
| 10 | fire resistant vacuum insulating glazing assembly |
| 11 | inner pane face of the first glass pane |
| 12 | outer pane face of the first glass pane |
| 21 | inner pane face of the second glass pane |
| 22 | outer pane face of the second glass pane |
| 31 | inner pane face of the third glass pane |
| 32 | outer pane face of the third glass pane |
| 4 | Discrete pillar |
| 41 | inner pane face of the fourth glass pane |
| 42 | outer pane face of the fourth glass pane |
| 5 | Hermetically bonding seal |
| 51 | inner pane face of the fifth glass pane |
| 52 | outer pane face of the fifth glass pane |
| 100, 100a, 100a' | Intumescent unit |
| 101, 101a, 101a' | Layer of intumescent material |
| 102 | Peripheral spacer |
| 7, 7b | Polymer interlayer |
| 8 | Functional coating |
| 9 | Circumferential spacer frame |
| GPx | Glass pane x, with x = 1 to 7 |
| GP3a, GP3b | Glass plies |
| V | Internal volume |
| Vi, Vi' | IU volume |
| Sp | Internal space |

The invention claimed is:

1. A fire resistant vacuum insulating glazing assembly comprising:
i. at least one vacuum insulating glazing unit comprising:
a. a first glass pane, GP1, having an inner pane face and an outer pane face and a second glass pane, GP2, having an inner pane face and an outer pane face;
b. a set of discrete pillars positioned between the first and second glass panes, maintaining a distance between the first and the second glass panes;
c. a hermetically bonding seal sealing the distance between the first and second glass panes over a perimeter thereof;
d. an internal volume, V, defined by the first and second glass panes and closed by the hermetically bonding seal; wherein there is a vacuum of absolute pressure of less than 0.1 mbar; and wherein the inner pane faces face the internal volume, V;
and
ii. a third glass pane, GP3, having an inner pane face and an outer pane face,
and
iii. at least one intumescent glazing unit comprising:
a fourth glass pane, GP4, having an inner pane face and an outer pane face,
a layer of intumescent material positioned between the inner pane faces of said third and fourth glass panes GP3 and GP4;
and
iv. a circumferential spacer frame positioned between the outer pane face of the second glass pane GP2 and the outer pane face of the third glass pane GP3 over a perimeter thereof, and maintaining a distance there between and, wherein the circumferential spacer frame, the outer pane face of the second glass pane GP2, and the outer pane face of the third glass pane GP3 define an internal space, Sp.

2. The fire resistant vacuum insulating glazing assembly according to claim 1, wherein the layer of intumescent material is selected from:
   a layer of hydrated alkali metal silicate composition,
   a layer of organic hydrogel, and
   a layer comprising a hydrated alkali metal silicate composition and organic hydrogel, present in the form of a mixture or in the form of different sub-layers.

3. The fire resistant vacuum insulating glazing assembly according to claim 1, wherein the layer of intumescent material is a layer comprising a hydrated alkali metal silicate composition.

4. The fire resistant vacuum insulating glazing assembly according to claim 1, wherein the layer of intumescent material is a layer of hydrated alkali metal silicate having a water content ranging from 18 to 50 wt % on a total weight of the layer.

5. The fire resistant vacuum insulating glazing assembly according to claim 1, wherein the at least one intumescent glazing unit, IU, further comprises a peripheral spacer defining an IU volume, Vi, between the inner pane faces of said third and fourth glass panes GP3 and GP4, and wherein the layer of intumescent material is positioned in the Vi volume.

6. The fire resistant vacuum insulating glazing assembly according to claim 5, wherein the layer of intumescent material is selected from:
   a layer of hydrated alkali metal silicate composition,
   a layer of organic hydrogel, and
   a layer comprising a hydrated alkali metal silicate composition and organic hydrogel, present in the form of a mixture.

7. The fire resistant vacuum insulating glazing assembly according to claim 5, wherein the layer of intumescent material is a layer comprising a hydrated alkali metal silicate composition.

8. The fire resistant vacuum insulating glazing assembly according to claim 5, wherein the layer of intumescent material is a layer of hydrated alkali metal silicate having a water content ranging from 35 to 48 wt % on a total weight of the layer.

9. The fire resistant vacuum insulating glazing assembly according to claim 1, wherein the circumferential spacer further comprises a circumferential seal.

10. The fire resistant vacuum insulating glazing assembly according to claim 1, comprising from 1 to 15 intumescent unit(s).

11. The fire resistant vacuum insulating glazing assembly according to claim 1, wherein at least one of the glass panes is a laminated glass pane.

12. The fire resistant vacuum insulating glazing assembly according to claim 1, wherein the third glass pane GP3 is a laminated glass pane.

13. The fire resistant vacuum insulating glazing assembly according to claim 1, wherein at least one of the glass pane faces is provided with a functional coating.

14. The fire resistant vacuum insulating glazing assembly according to claim 1, wherein the layer of intumescent material is obtained by a process comprising:
   preparing an intumescent material precursors mixture,
   applying the intumescent material precursors mixture on a glass pane of the fire resistant vacuum insulating assembly positioned in a horizontal position, and
   drying the intumescent material precursors mixture to form the layer of intumescent material, having a first side in contact with said glass pane.

15. The fire resistant vacuum insulating glazing assembly according to claim 14, wherein the process to obtain the layer of intumescent material further comprises partially dehydrating between the preparing of the mixture and the applying of the mixture on the glass pane of the fire resistant vacuum insulating assembly.

16. The fire resistant vacuum insulating glazing assembly according to claim 5, wherein the layer of intumescent material is obtained by a process comprising:
   preparing an intumescent material precursors mixture,
   pouring the mixture into the intumescent unit volume, Vi, and
   hardening the mixture to form the layer of intumescent material.

17. The fire resistant vacuum insulating glazing assembly according to claim 3, wherein the hydrated alkali metal silicate composition has a molar ratio $SiO_2/M_2O$ ranging from 2.5 to 8.

18. The fire resistant vacuum insulating glazing assembly according to claim 5, wherein the hydrated alkali metal silicate composition has a molar ratio $SiO_2/M_2O$ ranging from 3 to 8.

* * * * *